(12) United States Patent
DeLuca et al.

(10) Patent No.: US 10,785,598 B2
(45) Date of Patent: *Sep. 22, 2020

(54) COGNITIVE GEOFENCE UPDATES

(71) Applicant: International Business Machines Corporation, Armonk, NY (US)

(72) Inventors: Lisa Seacat DeLuca, Baltimore, MD (US); Jeremy A. Greenberger, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,386

(22) Filed: Feb. 28, 2020

(65) Prior Publication Data

US 2020/0204947 A1 Jun. 25, 2020

Related U.S. Application Data

(63) Continuation of application No. 16/598,133, filed on Oct. 10, 2019, now Pat. No. 10,623,894, which is a
(Continued)

(51) Int. Cl.
*H04W 4/021* (2018.01)
*G06K 9/62* (2006.01)
*G06N 20/00* (2019.01)

(52) U.S. Cl.
CPC .......... *H04W 4/022* (2013.01); *G06K 9/6267* (2013.01); *G06N 20/00* (2019.01)

(58) Field of Classification Search
CPC ..... H04W 4/022; G06K 9/6267; G06N 20/00; G06F 15/18
(Continued)

(56) References Cited

U.S. PATENT DOCUMENTS 9,060,248 B1 * 6/2015 Coulombe ............ H04W 4/021
9,602,970 B1 * 3/2017 Mahapatra ............ H04W 4/022
(Continued)

FOREIGN PATENT DOCUMENTS

WO WO2013058954 4/2013

OTHER PUBLICATIONS

P. Mell, et al. "*The NIST Definition of Cloud Computing*", NIST Special Publication 800-145, Sep. 2011, Gaithersburg, MD.
(Continued)

*Primary Examiner* — Michael Y Mapa
(74) *Attorney, Agent, or Firm* — Stephanie Carusillo, Esq.; George S. Blasiak, Esq.; Heslin Rothenberg Farley & Mesiti P.C.

(57) ABSTRACT

Methods, computer program products, and systems are presented. The method computer program products, and systems can include, for instance: examining data of breaches of a geofence by client computer devices to determine respective positions of the breaches; establishing an updated location for the geofence using the determined respective positions of the breaches; updating a location of the geofence so that the location of the geofence is the updated location; obtaining data of a client computer breach of the geofence at the updated location; and providing one or more output in response to the obtaining data of a client computer breach of the geofence at the updated location.

20 Claims, 11 Drawing Sheets

Related U.S. Application Data continuation of application No. 15/982,008, filed on May 17, 2018, now Pat. No. 10,560,803, which is a continuation of application No. 15/876,468, filed on Jan. 22, 2018, now Pat. No. 10,064,007.

(58) Field of Classification Search
USPC .................. 455/414.1–414.2, 456.1–457
See application file for complete search history.

(56) References Cited

U.S. PATENT DOCUMENTS

| | | | | |
|---|---|---|---|---|
| 9,838,843 | B1* | 12/2017 | Bajaj | .................. H04W 4/022 |
| 10,064,007 | B1 | 8/2018 | DeLuca | |
| 2013/0225196 | A1* | 8/2013 | James | .................. H04W 4/022 |
| | | | | 455/456.1 |
| 2014/0164118 | A1* | 6/2014 | Polachi | ............. G06Q 30/0259 |
| | | | | 705/14.57 |
| 2015/0120455 | A1 | 4/2015 | McDevitt | |
| 2015/0148061 | A1 | 5/2015 | Koukoumidis | |
| 2015/0278864 | A1 | 10/2015 | McDevitt | |
| 2015/0281889 | A1* | 10/2015 | Menendez | ........ H04L 29/08657 |
| | | | | 455/456.1 |
| 2016/0092685 | A1 | 3/2016 | Tse | |
| 2016/0094944 | A1* | 3/2016 | Kong | .................... H04W 4/022 |
| | | | | 455/456.1 |
| 2016/0119424 | A1 | 4/2016 | Kane | |
| 2017/0026786 | A1* | 1/2017 | Barron | ................. H04W 16/00 |
| 2017/0127233 | A1* | 5/2017 | Liang | .................... H04W 72/06 |
| 2017/0149795 | A1 | 5/2017 | Day | |
| 2019/0230465 | A1 | 7/2019 | DeLuca | |
| 2020/0045502 | A1 | 2/2020 | DeLuca | |

OTHER PUBLICATIONS

M. Stevens et al. "*Specification and Evaluation of Geofence Boundary Violation Detection Algorithms*". 2017 International Conference on Untanned Aircraft Systems. Jun. 13, 2017.

B. Maurin, et al. "Monitoring Crowded Traffic Scenes" IEEE 5th International Conference on Intelligent Transportation Systems, Singapore, Sep. 3, 2002.

List of IBM Patents or Applications Treated as Related, Mar. 5, 2020, 2 pgs.

* cited by examiner

COGNITIVE GEOFENCE UPDATES

CROSS-REFERENCE TO RELATED APPLICATION

This application is a continuation of U.S. patent application Ser. No. 16/598,133 filed Oct. 10, 2019, entitled "Cognitive Geofence Updates," which is incorporated by reference herein in its entirety, and which is a continuation of U.S. patent application Ser. No. 15/982,008 filed May 17, 2018, entitled "Cognitive Geofence Updates," which is incorporated by reference herein in its entirety, and which is a continuation of U.S. patent application Ser. No. 15/876,468, filed Jan. 22, 2018, entitled, "Cognitive Geofence Updates," which is incorporated by reference herein in its entirety.

BACKGROUND

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: examining data of breaches of a geofence by client computer devices to determine respective positions of the breaches; establishing an updated location for the geofence using the determined respective positions of the breaches; updating a location of the geofence so that the location of the geofence is the updated location; obtaining data of a client computer breach of the geofence at the updated location; and providing one or more output in response to the obtaining data of a client computer breach of the geofence at the updated location.

In another aspect, a computer program product can be provided. The computer program product can include a computer readable storage medium readable by one or more processing circuit and storing instructions for execution by one or more processor for performing a method. The method can include, for example: examining data of breaches of a geofence by client computer devices to determine respective positions of the breaches; establishing an updated location for the geofence using the determined respective positions of the breaches; updating a location of the geofence so that the location of the geofence is the updated location; obtaining data of a client computer breach of the geofence at the updated location; and providing one or more output in response to the obtaining data of a client computer breach of the geofence at the updated location.

In a further aspect, a system can be provided. The system can include, for example a memory. In addition, the system can include one or more processor in communication with the memory. Further, the system can include program instructions executable by the one or more processor via the memory to perform a method. The method can include, for example: examining data of breaches of a geofence by client computer devices to determine respective positions of the breaches; establishing an updated location for the geofence using the determined respective positions of the breaches; updating a location of the geofence so that the location of the geofence is the updated location; obtaining data of a client computer breach of the geofence at the updated location; and providing one or more output in response to the obtaining data of a client computer breach of the geofence at the updated location.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
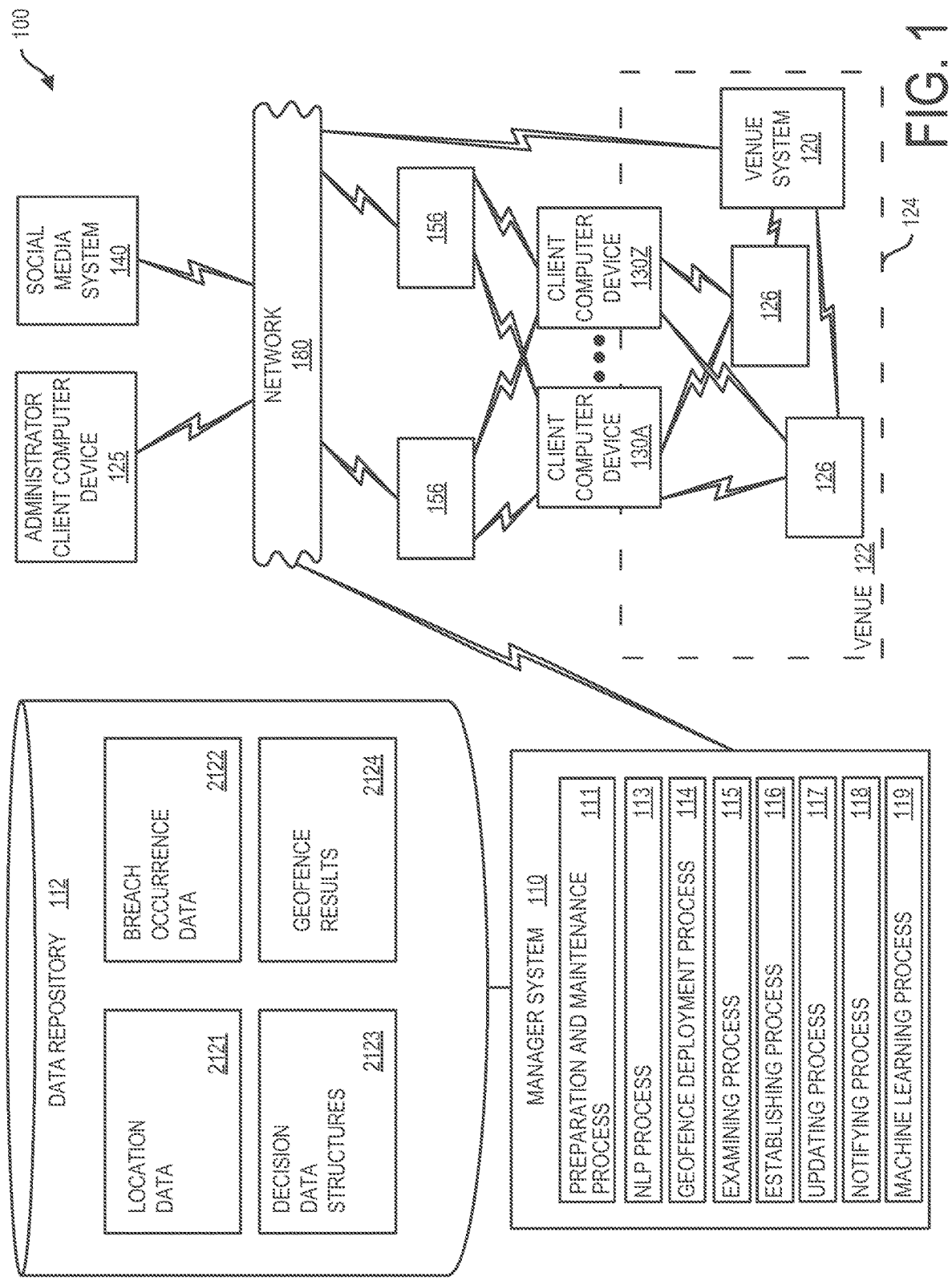
FIG. 1 depicts a system having a manager system, client computer devices, and an administrator client computer device according to one embodiment.

System 100 for use in supporting location based messaging services is shown in FIG. 1. System 100 can include manager system 110 having an associated data repository 112, venue system 120, administrator computer device 125, a plurality of client computer devices 130A-130Z, and social media system 140. Manager system 110, venue system 120, administrator computer device 125, a plurality of client computer devices 130A-130Z, and social media system 140 can be in communication with one another via network 180. System 100 includes numerous devices, which may be computing node based devices, connected by a network 180. Network 180 may be a physical network and/or a virtual network. A physical network can be, for example, a physical telecommunications network connecting numerous computer nodes or systems, such as computer servers and computer clients. A virtual network can, for example, combine numerous physical networks or parts thereof into a logical virtual network. In another example, numerous virtual networks can be defined over a single physical network.

In one embodiment manager system 110 can be external to venue system 120 social media system 140 and to each of the one or more client computer device 130A-130Z. In one embodiment manager system 110 can be co-located with venue system 120 and/or social media system 140. In one embodiment manager system 110 can be co-located with one or more client computer device 130A-130Z.

Referring further to FIG. 1, venue system 120 can be located in venue 122 that is delimited by venue geographical border 124 that specifies the geographical coordinate area occupied by venue 122. In one embodiment, an organizational entity that operates manager system 110 can be in common with the organizational entity that operates venue system 120 and venue 122. Venue 122 can be a retail or restaurant establishment venue in one embodiment. Venue system 120 can be disposed in venue 122 defined by geographical boundary 124. Client computer devices 130A-130Z can be mobile computer devices, moveable between locations, internal and external to venue 122, and thus are shown in FIG. 1 as being partially disposed within geographical boundary 124 and partially disposed external to geographical boundary 124. Client computer devices 130A-130Z can be wireless computer devices that can be connected to network 180 by alternative radio communication protocols. For example, client computer devices 130A-130Z can connect to network 180 by connection nodes 156. Connection nodes 156 can be connection nodes that facilitate connection to a cellular communication network. Client computer devices 130A-130Z can also be connected to network 180 via connection nodes 126. Connection nodes 126 can be provided by IEEE 802.11 access points of a WIFI wireless network provided by an operator of venue system 120, in which operator can be the operator of venue 122 and manager system 110.

In one embodiment, each client computer device 130A-130Z can be associated to a certain user. In one embodiment, each user of system 100 is a registered user of a retail vendor that operates a plurality of venues such as venue 122. Users having records stored data repository 112 can be registered users of manager system 110 and of an enterprise that operates venue 122 e.g. can be customer loyalty card holders of the vendor who receive customer loyalty cards in exchange for data regarding themselves.

Each of the different client computer devices 130A-130Z can be associated to a different user. Regarding one or more client computer device 130A-130Z, a computer device of one or more client computer device 130A-130Z in one embodiment can be a computing node device provided by a client computer, e.g. a mobile device, e.g. a smartphone or tablet, a laptop, smartwatch or PC that runs one or more program, e.g. including a web browser for opening and viewing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment.

Manager system 110 can run various processes including preparation and maintenance process 111, Natural Language Processing (NLP) process 113, geofence deployment process 114, examining process 115, establishing process 116, updating process 117, notifying process 118, and machine learning process 119.

Data repository 112 can store various data, such as location data specifying history of locations of client computer devices 130A-130Z, breach occurrence data specifying occurrences of geofence breaches by client computer devices 130A-130Z, decision data structures for use in providing artificial intelligence (AI) decisions, and geofence results data specifying a history of geofences deployed by system 100 and performance results associated therewith.

Manager system 110 can run geofence deployment process 114 to deploy a geofence. Manager system 110 running geofence deployment process 114 can deploy a geofence based on administrator user defined configuration data that can be defined using an administrator user interface. Using an administrator user interface, an administrator user can enter such configuration data as location of a geofence, timing of a geofence, size of a geofence, and shape of a geofence. In one embodiment an administrator user can specify geofence location to encompass a venue, such as venue 122. A geofence location can be defined by a geofence perimeter. Geofence configuration data entered by an administrator user can also include geofence events, such as geofence breaches and dwells, as well as outputs associated with the geofence events. An output associated with a geofence can include, e.g. one or more notification output and/or one or more process output. A notification in one embodiment, can include e.g. a text based notification prompting a user to travel to venue 122 upon breaching a geofence encompassing venue 122. Such notification can include, e.g. a promotion regarding a product available at venue 122.

Manager system 110 running geofence deployment process 114, in one embodiment can deploy a geofence. Manager system 110 running geofence deployment process 114 to deploy geofence can include manager system 110 sending geofence configuration data to geofence breach determination processes run by respective client computer devices 130A-130Z. Thus, manager system 110 running geofence deployment process 114 can support distributed local geofence breach determination processes run locally on respective client computer devices 130A-130Z.

Manager system 110 running examining process 115 can examine breach data respecting breaches of a geofence by client computer devices of client computer devices 130A-130Z. Manager system 110 running examining process 115 can examine breach data respecting breaches of a geofence by client computer devices of client computer devices 130A-130Z. Breach data can include, e.g. breach occurrence data that can specify a computer device identifier that has breached a geofence as well as a timestamp of the breach. Breach data can also include location data of a breach. For determining location data of a breach, manager system 110 can use the client computer device identifier specified within breach occurrence data to lookup location data of a client computer device specified by an identifier at the time of a breach occurrence and can use that data to determine a breach position. A breach position herein can specify position on a geofence perimeter defining a geofence that which a breach occurred.

Manager system 110 running examining process 115 can examine breach data for a plurality of breaches of a geofence by a plurality of client computer devices over a period of time. Manager system 110 running examining process 115 can determine breach position data for a plurality of breaches of a period of time by a plurality of client computer devices of client computer devices 130A-130Z. Manager system 110 running examining process 115 can perform additional processes such as classifying breach positions of breaching client computer devices into one of a plurality of available candidate breach positions, and can also predict future breach positions of a geofence by client computer devices of client computer devices 130A-130Z.

Manager system 110 running establishing process 116 can establish an updated location for a geofence. Manager system 110 running establishing process 116 can update a location of a deployed geofence. Manager system 110 running establishing process 116 can update a location of a deployed geofence, so that the geofence is at a location predicted to increase a number of breaches of the geofence. Manager system 110 running establishing process 116 can determine an updated location for a geofence based on a region of the geofence predicted to have the largest number of breaches.

Embodiments herein recognize that updating a location of a geofence to a new location in a direction from a prior location that is based on a predicted geofence perimeter region of highest number of breaches can increase the number of geofence breaches. Manager system 110 running establishing process 116 can qualify the running of examining process 115 based on one or more criterion being satisfied. The one or more criterion being satisfied can be the criterion that a geofence subject to examining is an underperforming geofence having less than a targeted number of breaches. Embodiments herein recognize that geofences sometimes underperform and produce less breaches than anticipated. Accordingly, features are provided herein so that a geofence can automatically update its location to produce an increased number of breaches so that geofence breaches can more accurately track a designed number of breaches targeted at the time of initial deployment of the geofence.

Manager system 110 running updating process 117 can update a location of a deployed geofence so that the deployed geofence is at an updated location established by manager system 110 running establishing process 116. Manager system 110 running updating process 117 can send location change information to client computer devices of client computer devices 130A-130Z. Manager system 110 running updating process 117 can send location change information to breach determination processes running locally on client computer devices of client computer devices 130A-130Z, so that respective client computer devices of client computer devices 130A-130Z can locally perform geofence breach determinations using the updated geofence location determine by manager system 110 running establishing process 116.

Manager system 110 running notifying process 118 can send notifications to client computer devices of client computer devices 130A-130Z that have breached a geofence. In one embodiment respective client computer devices of client computer devices 130A-130Z can locally on their own respective hardware using locally distributed machine logic, determine that a geofence breach has occurred and can send a communication to manager system 110 specifying that a geofence breach has occurred. In response to receipt of a geofence breach occurrence communication, manager system 110 running notifying process 118 can send a notification to the breaching client computer device. The notification can include, e.g. a text based notification, e.g. specifying a promotion prompting a user of the client computer device to travel to a venue encompassed within a geofence, defined by a geofence perimeter.

Manager system 110, running machine learning process 119 can update one or more process run by manager system 110 based on obtained data to improve and accuracy and/or reliability of the one or more process. In one embodiment, manager system 110 running establishing process 116 can use a decision data structure that maps predicted geofence breach positions to geofence location change information defining an updated geofence location. Such a decision data structure can have parameter values, such as parameter values specifying decision thresholds and/or distance units. Manager system 110 in one embodiment can run a plurality of instances of such a decision data structure, each instance for a different geofence subject to examining establishing and updating processes herein. For each instance of the decision data structure, manager system 110 can vary such threshold parameter values and distance unit parameter values within valid ranges. Manager system 110 running machine learning process 119 can update the threshold value and/or distance value parameters of the different instances of the decision data structure. Manager system 110 can monitor performance of the different geofences subject to establishing and updating using the different data structures and based on the performance monitoring can update the parameters of the decision data structures so that the parameters values over time converge toward values that are in common with geofences that are determined to be the best performing geofences according to one or more criterion.

Manager system 110 can run preparation and maintenance process 111 to populate and maintain data of data repository 112 for use by various processes run by manager system 110 including e.g. predicting examining process 115.

Manager system 110 can run NLP process 113 to process data for preparation of records that are stored in data repository 112 and for other purposes. Manager system 110 can run a Natural Language Processing (NLP) process 113 for determining one or more NLP output parameter of a message. NLP process 113 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 113 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Data repository 112 can include location data area 2121 which can include historical data on locations visited by users of system 100. As users move throughout an environment their movement can be traced and logged into location data area 2121. In one embodiment, location data area 2121 can include a table associating users within their respective locations (e.g. given in coordinates) and each location can be associated with a timestamp. Thus, manager system 110 is able to perform a variety of useful analyses, e.g. can ascertain a performance of a hypothetical geofence had a hypothetical geofence been previously deployed at a certain previous point in time. The performance of a hypothetical geofence can be ascertained in terms of events associated with a geofence, e.g. a number of breaches or a number of dwells (a user remaining within a geofence for more than a threshold period of time). For providing of location data that specifies a location of users of system 100, system 100 can be configured to provide locating services. Locating services can be e.g. control plane based, self-reported based, local range based or a combination of the noted types. In one embodiment, locating services provided by system 100 can locate a computer device of client computer devices 130A-130Z using e.g. GPS based locating services, located services based on processing of signals received by connection nodes 156 (cellular network), locating services based on processing of signals received by connection nodes 126 (LAN) or a combination of such services.

Data repository 112 can include breach occurrence data area 2122. On determination that a geofence breach has occurred, respective client computer devices of client computer devices 130A-130Z can send communications to manager system 110 with breach occurrence data. Breach occurrence data can include, e.g. an identifier of the breaching client computer device of client computer devices 130A-130Z as well as a timestamp of the breach. Respective client computer devices of client computer devices 130A-130Z can run respective breach determination programs to determine that a breach has occurred. A breach can be determined to have occurred when a client computer device enters an interior of a geofence defined by a geofence perimeter. On receipt of breach occurrence data from client computer devices of client computer devices 130A-130Z manager system 110 responsively can store the breach occurrence data into breach occurrence data area 2122 of data repository 112.

Data repository 112 can include decision data structures area 2123. Within decision data structures area 2123, data repository 112 can store decision data structures. In one embodiment, there can be stored in decision data structures area 2123, a machine logic artificial intelligence (AI) decision data table that maps sections of a geofence perimeter predicted to have a highest number of breaches to updated geofence locations defined by location change information.

Data repository 112 can store in geofence results area 2124, data respecting historical geofences deployed by manager system 110, and results associated therewith. Results data can include, e.g. data on a number of breaches, data on the accuracy of past geofences, e.g. in terms of a geofence's ability to yield breaches according to a count that is in accordance with a predicted count of breaches.

Figure 2:
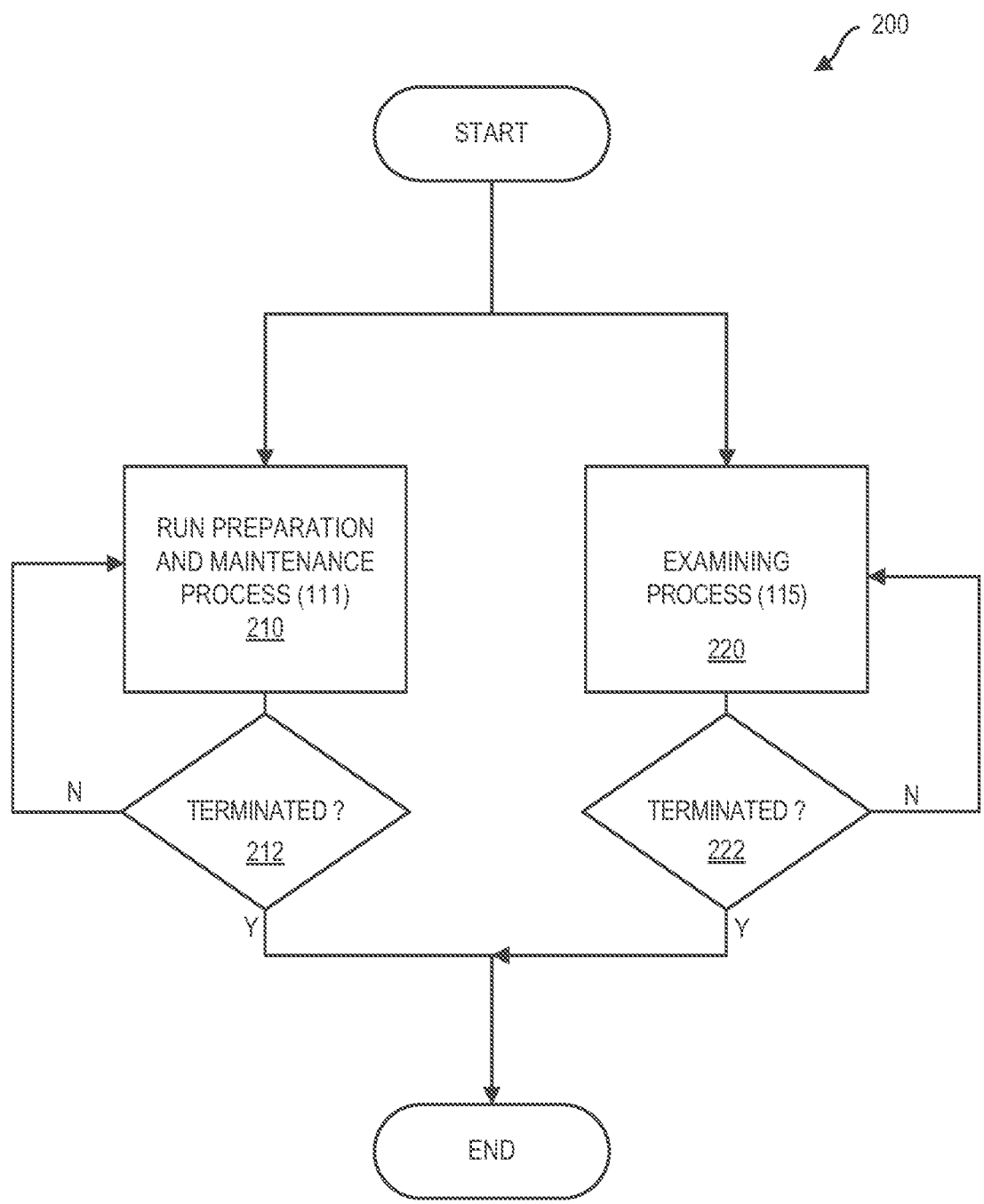
FIG. 2 is a flowchart illustrating a method for performance by a manager system according to one embodiment.

FIG. 2 is a flowchart illustrating coordination of processes that can be performed by manager system 110 of FIG. 1, in accordance with one or more embodiments set forth herein.

At block 210, manager system 110 can run preparation and maintenance process 111 to populate prepare and maintain various data of data repository 112 including data of locations areas 2121-2124. Manager system 110 can run preparation and maintenance process 111 iteratively until process 111 is terminated at block 212.

At block 220, manager system 110 can run examining process 115 to determine geofence breach positions. For support of running of examining process 115 iteratively, manager system 110 can be running e.g. NLP process 113, establishing process 116, updating process 117, notifying process 118, and/or machine learning process 119 iteratively. Manager system 110 can run examining process 115 until examining process 115 is terminated at block 222. Manager system 110 can run preparation and maintenance process 111 and examining process 115 concurrently and can run each of process 111 and process 115 iteratively.

Figure 3:
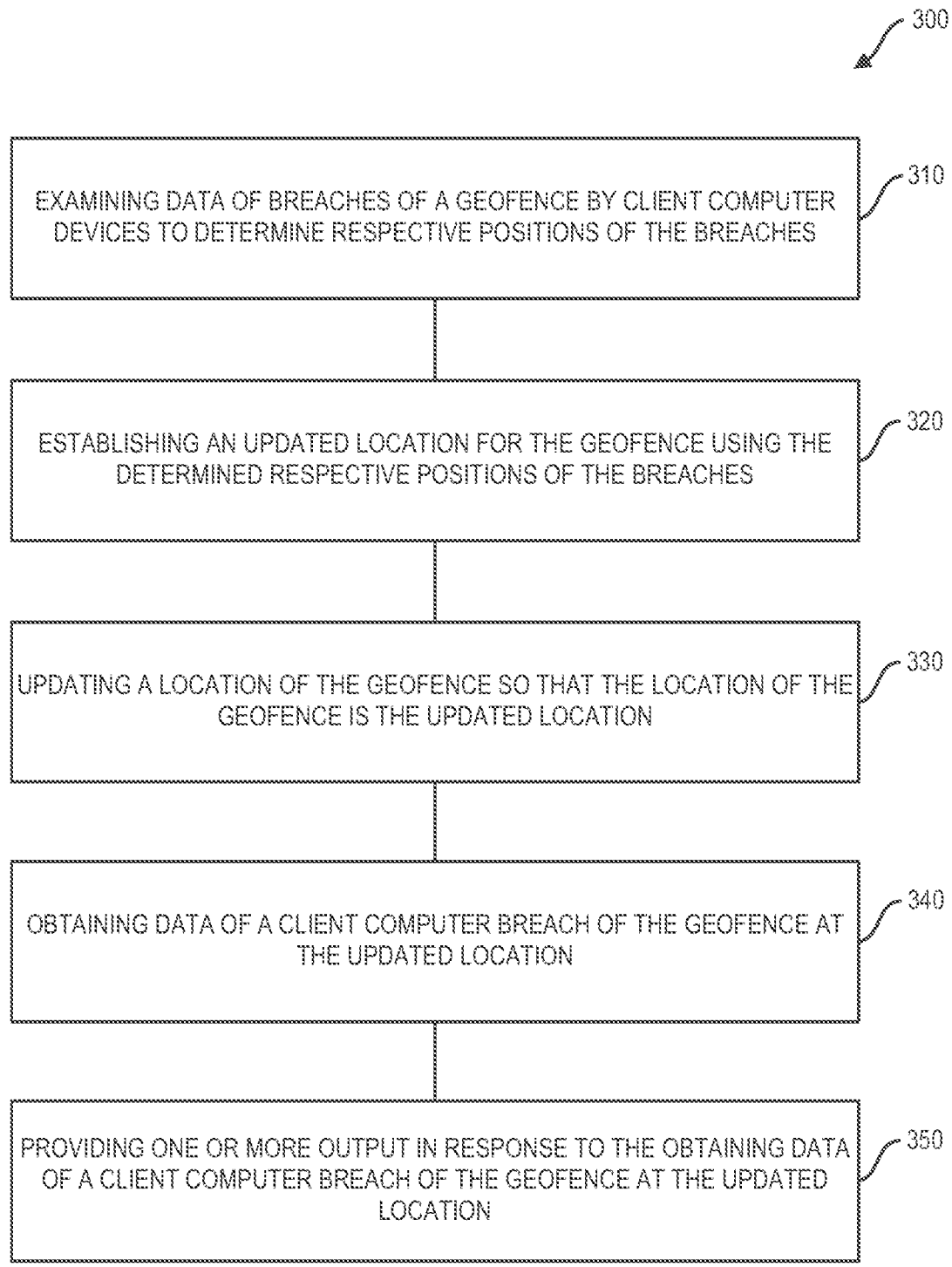
FIG. 3 is a flowchart illustrating a method for performance by a manager system according to one embodiment.

A method 300 for performance by manager system 110 is illustrated with reference to FIG. 3. At block 310, manager system 110 can perform examining data of breaches of a geofence by client computer devices to determine respective positions of the breaches. At block 320, manager system 110 can perform establishing an updated location for the geofence using the determined respective positions of the breaches. At block 330, manager system 110 can perform updating a location of the geofence so that the location of the geofence is the updated location. At block 340, manager system 110 can perform obtaining data of a client computer breach of the geofence at the updated location. At block 350, manager system 110 can perform providing one or more output in response to the obtaining data of a client computer breach of the geofence at the updated location.

Figure 4:
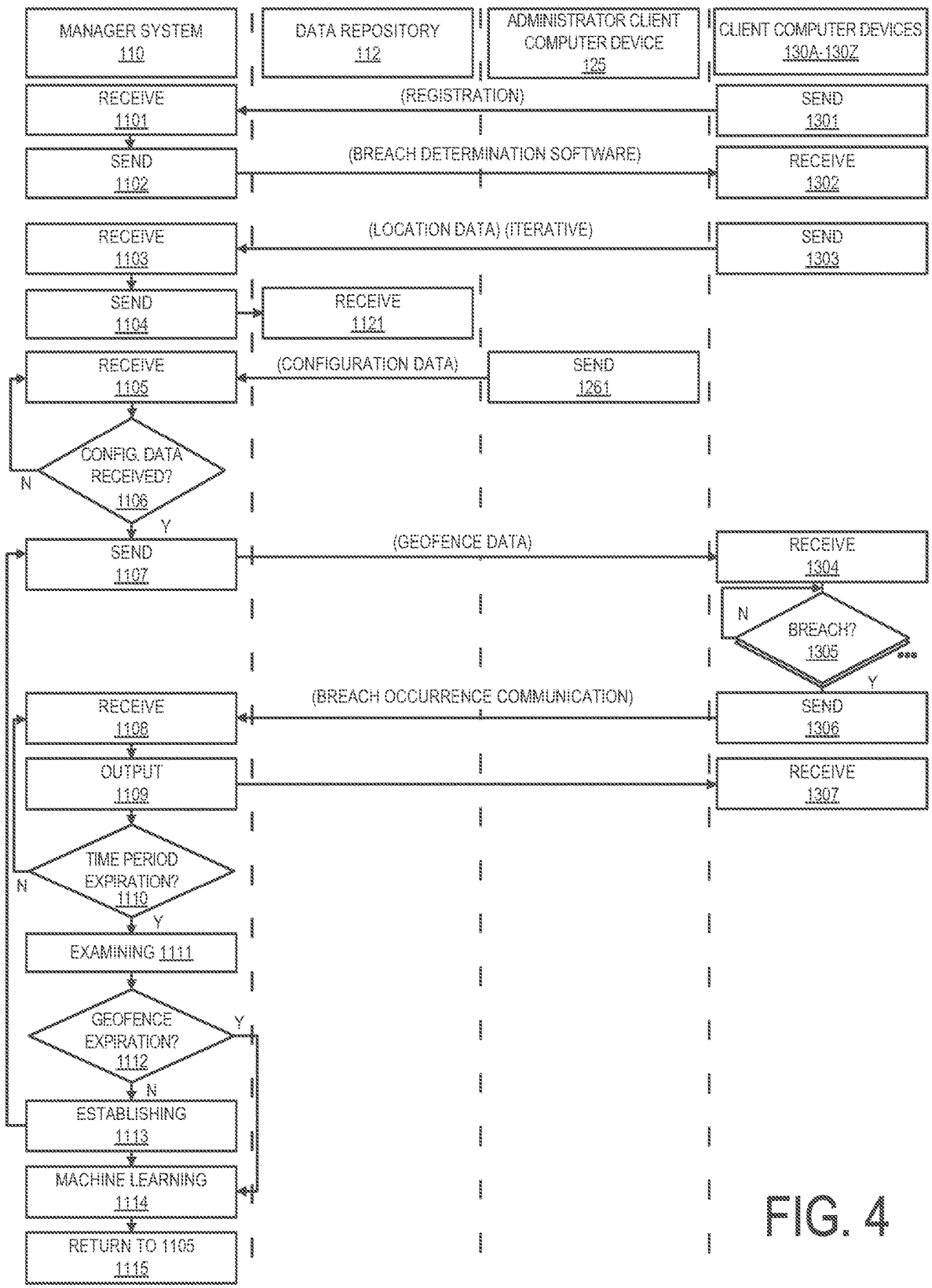
FIG. 4 is a flowchart illustrating a method for performance by a manager system interoperating with other components according to one embodiment.

A specific example of method 300 is set forth in reference to the flowchart of FIG. 4 illustrating a specific example of method 300 from the perspective of manager system 110, data repository 112, administrator computer device 125, and client computer devices 130A-130Z.

At block 1301, client computer devices 130A-130Z can send registration request data for receipt by manager system 110 at block 1101. Users of client computer devices 130A-130Z can register their respective client computer devices 130A-130Z to participate in a location based messaging services, in which messages are delivered to computer devices of client computer devices 130A-130Z based on a location of the computer devices.

One example is a customer support service, wherein users of client computer devices 130A-130Z are customers of an entity such as a retail or restaurant organization having numerous venues throughout a geographical area, may wish to better communicate with its customers by way of a location based messaging service. In one common use case, the service may recognize that a customer has reached a location in proximity with the venue. Based on such recognition the service may notify the customer of a special offer available at the venue, to entice the customer to travel to the venue. On reaching the venue of a retail or restaurant organization may send a location based message to the customer to entice the customer to travel to a specific location within the venue. An administrator user can define parameters of a location based messaging service using an administrator user interface such as administrator user interface 500 (FIG. 5) as set forth herein. Administrator user interface 500 can be manually operated user interfaces displayed on a display of an administrator computer device 125. Registration request data sent at block 1301 for receipt at block 1101 can include, e.g. name and contact information of a user of a computer device as well as other information in facilitating messaging of the user by the manager system 110, e.g. messaging service, account information to allow messages to be received e.g. text based notifications to be received by a customer.

On receipt of registration request data at block 1101, manager system 110 can register a user and can send at block 1102 location based messaging software to client computer devices 130A-130Z, from which registration requests have been received. Location based messaging software, received by client computer devices 130A-130Z at block 1302, can include software that allows respective client computer devices 130A-130Z to determine, locally on the respective computing nodes, that a geofence event has occurred. Geofence events can include e.g. geofence breaches, geofence area dwells, and geofence expirations. A breach can be regarded to have occurred when a client computer device 130-130Z crosses a geofence perimeter when travelling along a path from an exterior of a geofence perimeter to an interior of a perimeter. A dwell can be regarded to have when a client computer device 130A-130Z if it remains within a geofence area for more than a threshold period of time. With a location based messaging software installed on a computer device, a computer device is able to determine that an event has occurred. On the determining that an event has occurred, a certain computer device of client computer devices 130A-130Z can send a notification to manager system 110, which can then respond by providing one or more output, e.g. such as an output notification to the certain computer device.

Embodiments herein recognize that advantages can accrue by distributing breach determination software to client computer devices 130A-130Z (block 1102) so that client computer devices 130A-130Z are enabled to determine, locally on their respective hardware platforms, geofence breaches once geofence information is received (block 1304). In one aspect, the determination of geofence breaches locally, at client computer devices 130A-130Z can reduce power consumption to increase battery life of client computer devices 130A-130Z. Resource consumption associated with geofence breach determinations can be less than resource consumption levels associated with an alternative scheme in which location data is iteratively transmitted externally to manager system 110 for processing for breach determination externally from client computer devices 130A-130Z. The determination of geofence breaches locally, by respective client computer devices 130A-130Z can reduce wireless data traffic in an environment, thereby increasing available bandwidth, which is of increased importance in bandwidth limited 5G and Internet of Things (TOT) environment. The determination of geofence breaches locally by respective client computer devices 130A-130Z can increase determination speed and reduce latency relative to latency associated with an alternative scheme in which geofence breaches are determined remotely by manager system 110. The determination of geofence breaches locally, by client computer devices 130A-130Z can also increase determination accuracy. In an alternative embodiment where geofence breach determination is performed remotely, e.g. on manager system 110 where manager system 110 is remote from client computer devices 130A-130Z, a determination might be made based on a past location of a client computer device that is no longer accurate. Also, geofence determinations can be dependent on network connectivity. In some use cases, manager system 110 can send with geofence information at block 1111 to a certain computer device, textual message data, specifying content of a textual based message that can be output by the certain computer device responsive to a breach being detected.

Embodiments herein recognize that while advantages associated with client distributed logic for geofence event determination can be substantial, the advantages may not be yielded if a deployed geofence is not accurately deployed. Re-deployment can create risks and resource consumption that outweigh the benefits of client distributed geofence event determination logic. Embodiments herein set forth to provide updates to geofence locations wherein geofence breach determinations are made using distributed geofence breach determination logic running locally on client computer devices of client computer devices 130A-130Z. Embodiments herein can update a distributed geofences using reduced bandwidth and processing resources and can perform location updates of a distributed geofences so that updates can be implemented asynchronously between computer devices of client computer devices 130A-130Z. Embodiments can process and store data respecting a geofence as a logically constant geofence notwithstanding location changes of the geofence and differentiated locations of the geofence between client computer devices of client computer devices 130A-130Z e.g. as a result of asynchronous updating of a geofence location between client computer devices, and various machine logic rules that impose restrictions on locations of a geofence.

At block 1303 client computer devices 130A-130Z can send location data reporting their current location for receipt by manager system 110 at block 1103. The sending at block 1303 can be iterative and can be ongoing concurrently with remaining processes. Manager system 110 can additionally or alternatively be iteratively receiving location data reporting the respective locations of computer devices from other data sources, e.g. sources associated with a cellular and/or LAN based locating service. On receipt of location data at block 1103 manager system 110 can send the received location data to data repository 112 for receipt by data repository 112 at block 1121 and storage by data repository 112 into location data area 2121. Sending and receiving for storage at blocks 1104 and 1121 respectively can be performed iteratively.

Figure 5:
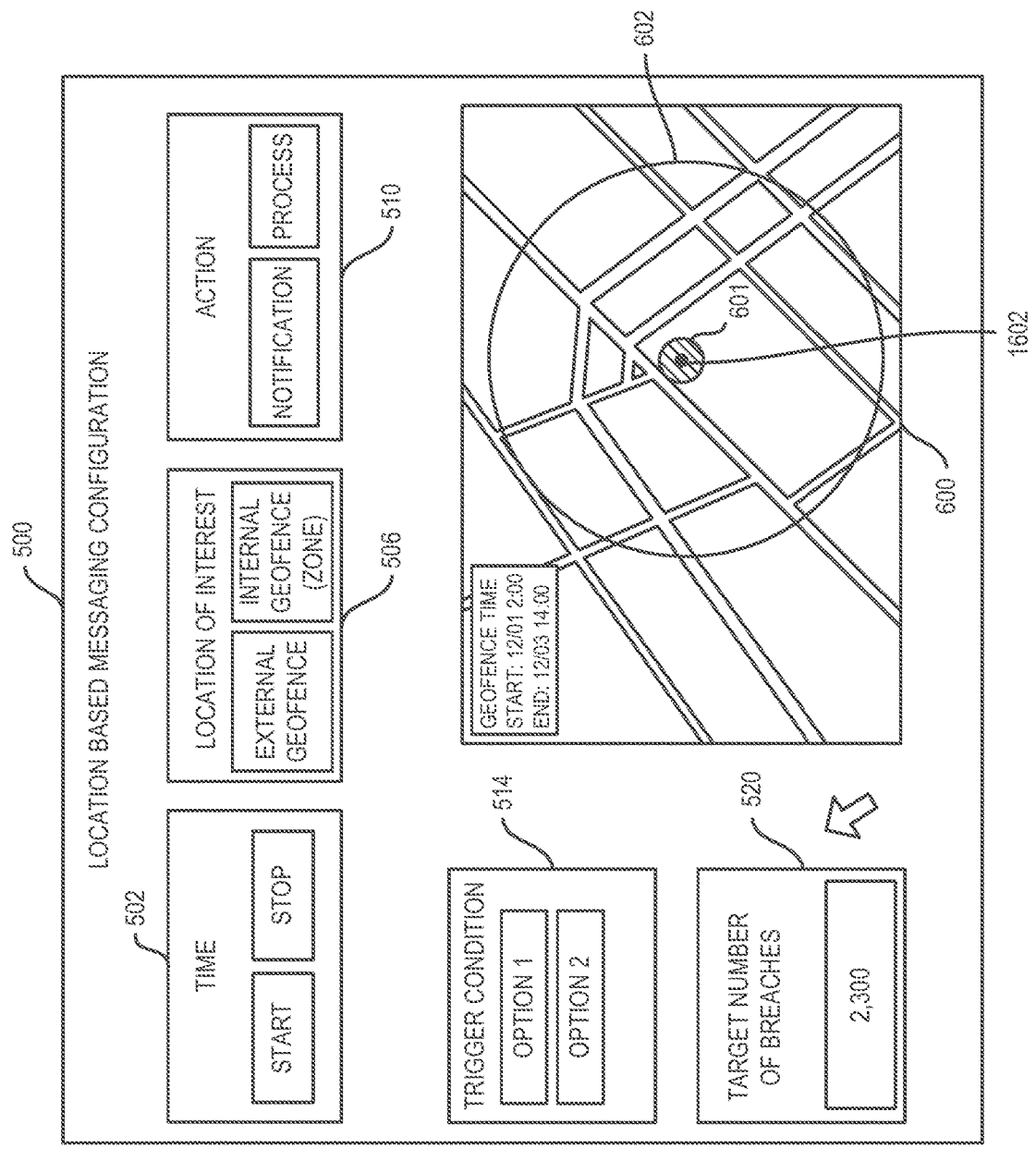
FIG. 5 depicts an administrator user interface according to one embodiment.

At block 1261, administrator computer device 125 can send configuration data for receipt by manager system 110 at block 1105. Configuration data sent at block 1261 can include data that configures manager system 110 to output one or more location based message. The administrator user interface 500, for use by an administrator user establishing location based messaging service configuration data as shown in FIG. 5. Using area 502, an administrator can specify a start time and a stop time of a location based messaging service.

Using area 506, an administrator user using administrator user interface 500 can specify a location of a geofence for deployment. A geofence location can be defined by a geofence perimeter. The geofence that is specified can include e.g. a venue external geofence or a venue internal geofence. A venue internal geofence herein can be referred to as a "zone".

A geofence having a location specified can be depicted in area 600 of administrator user interface 500. Area 600 can depict a geofence perimeter 602 defining a geofence as specified by an administrator user using administrator user interface 500. Area 600 can also include depictions of features such as roadways as shown included in an environment of a geofence. The geofence can be specified to have a perimeter such that the perimeter 602 encompasses a location of interest 601 which location of interest 601 can specify a location of interest such as a venue 122 (FIG. 1). Area 600 can also depict a center 1602 of a geofence.

Using area 510, an administrator user can specify an action to be performed on the occurrence of an event. Geofences in one embodiment can specify a two-dimensional area determined by a perimeter e.g. depicted by perimeter 602. The one or more action can include e.g. a notification and/or a process. A notification can include a text based message sent via a messaging system to a client computer device, e.g. upon an occurrence of a specified geofence event. An action can include an automated process e.g. a machine learning process in which performance of system 100 is monitored e.g. using one or more sensor such as a radio receiver for use in obtaining location data. A specified notification can be a notification to prompt a user of a computer device to travel to a location of a depicted location of interest 601 such as a venue 122 (FIG. 1). The notification can include e.g. a text based promotion of a product available at venue 122 (FIG. 1).

Using area 514, an administrator user can specify a trigger condition. A trigger condition can be e.g. an event that triggers the providing of one or more output. A trigger condition can include e.g. a client computer device of client computer devices 130A-130Z breaching a geofence and/or a dwell event wherein the client computer device remains within an area of a geofence for more than a threshold period of time.

For purposes of illustration, geofences herein can be symmetrical and circular. In the case of a circle shaped geofence a geofence location can be provided by a center (e.g. represented by 1602) and a radius which defines a perimeter (e.g. represented by perimeter 602) that defines a geofence. However, it will be noted that candidate geofences herein can be defined by perimeters of any shape.

Manager system 110 at block 1106 can determine whether configuration data has been received defining a new geofence and if no geofence defining data has been received, manager system 110 can iteratively perform the loop depicted at block 1105-1106 to wait for receipt of geofence defining configuration data defined by an administrator user using an administrator user interface 500. On receipt of geofence defining configuration data at block 1106, manager system 110 can proceed to deploy the defined geofence. Manager system 110 at block 1106 on receipt of geofence defining configuration data and to deploy an administrator defined geofence, can proceed to block 1107 to send geofence data for receipt by client computer devices of client computer devices 130A-130Z at block 1304. The geofence data sent to client computer devices 130A-130Z at block 1107 for deployment of a geofence can include geofence data of the geofence configuration data received at block 1105. Geofence data sent at block 1107 by manager system 110 can include geofence location data in the case of a circular geofence, geofence location data can be specified by a center point of the geofence and a radius of the geofence. Manager system 110 in one embodiment at block 1107, can send to client computer devices 130A-130Z geofence data including geofence location defining data provided by a geofence center point and a radius. Based on administrator user defined configuration data in one embodiment, a geofence can be specified to be at a location that encompasses venue 122 (FIG. 1).

At block 1107 manager system 110 can send geofence data to geofence breach determination processes running on client computer devices 130A-130Z so that on receipt of the geofence data at block 1304, the respective client computer devices 130A-130Z can be enabled to perform geofence breach determination based on the geofence location defined by the geofence data sent at block 1107.

Referring again to the flowchart of FIG. 4, client computer devices 130A-130Z, at block 1305 can determine if a geofence deployed locally based on data received at block 1304, has been breached. Block 1305 is depicted in FIG. 4 in double-lined format to indicate that block 1305 can be performed separately and contemporaneously at each computer device of client computer devices 130A-130Z. On the determination that a breach has occurred, a computer device, e.g. computer device 130A detecting that a breach has occurred, can send a breach occurrence communication at block 1306 for receipt by manager system 110 at block 1112 indicating that a breach has occurred.

Responsively, manager system 110 can provide one or more output at block 1109. The one or more output can include, e.g. a notification to the computer device, e.g. computer device 130A for receipt by computer device 130A at block 1307. The notification can include e.g. a promotional message prompting a user to travel to a location of interest such as location of interest 601 depicted in area 600 of administrator user interface 500 (FIG. 5), e.g. a location of a venue 122 (FIG. 1) within a geofence that has been breached (e.g. where the geofence is delimited by a perimeter encompassing and spaced apart from a venue). The one or more output provided at block 1109 can include one or more output other than a notification output. The output can include, e.g., a communication to activate a process e.g. a process of machine learning process 119.

Manager system 110 at block 1110 can determine if there has been an expiration of a geofence time period of interest. For performing examining of geofence breach data in one embodiment, manager system 110 can divide a geofence activation period in which a geofence is active and to time periods of interest. Time periods in one embodiment can be arbitrarily selected, e.g. can include time periods of 10 minutes, 1 hour, 5 hours, or a time period in dependence on an activation period of a geofence. For example, by machine logic rule a time period of interest can be automatically selected to be a time period equal to 1/M (e.g. 1/10 or 1/100) of a total activation period for a geofence. Time periods can be established by administrator defined configuration data defined using administrator user interface 500 (FIG. 5). If the time period of interest is determined not to have expired at block 1110, manager system 110 can proceed to perform the loop indicated by blocks 1108, 1109, and 1110 until the time period expiration condition is satisfied. Whereupon manager system 110 can proceed to block 1111 to perform examining of geofence breaches, as set forth herein.

Figure 6:
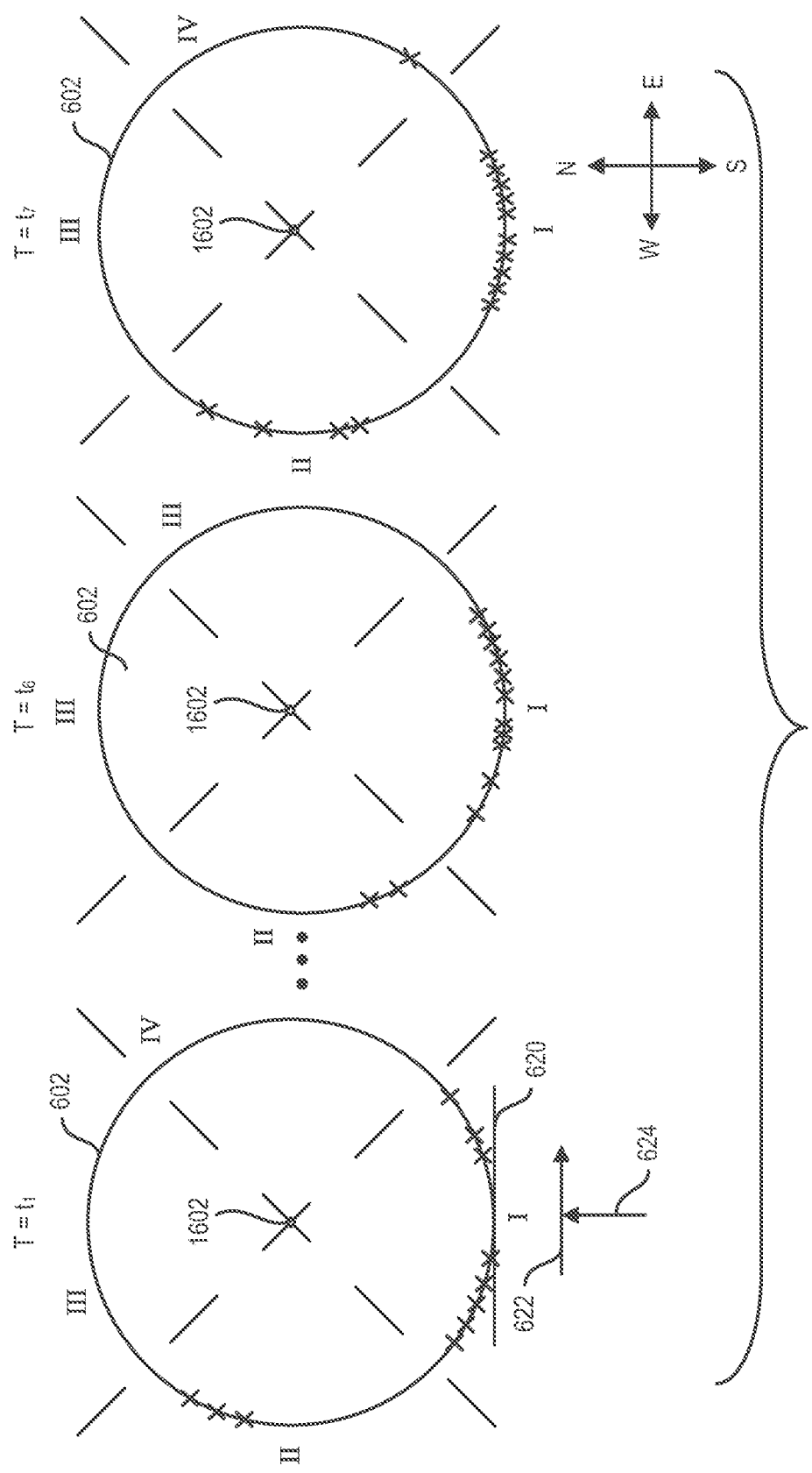
FIG. 6 depicts breach positions at different perimeter locations of a geofence over the course of different time periods according to one embodiment.
Figure 7:
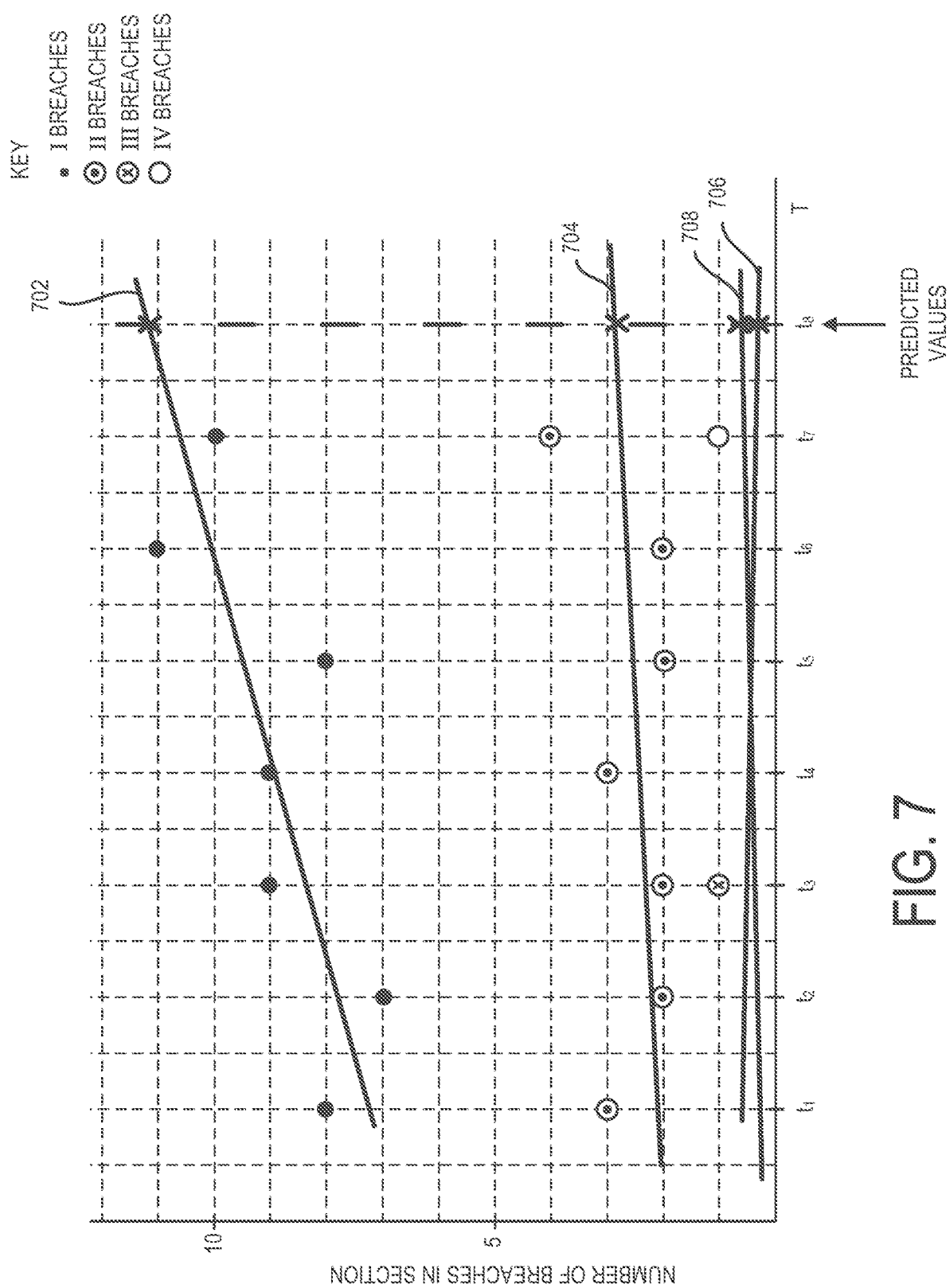
FIG. 7 depicts geofence breach determination data and regression analysis thereof according to one embodiment.

Manager system 110 performing examining at block 1111 in one embodiment is described further in reference to illustrative FIGS. 6 and 7. Referring to FIG. 6, FIG. 6 depicts geofence breaches by different computer devices with respect to a deployed geofence, deployed at blocks 1107 and 1304 defined by perimeter 602, over the course of various time periods of interest, namely, through the time periods of interest $T=T_1$ through $T=T_7$ with breaches during the time periods of interest $T=T_1$, $T=T_6$, and $T=T_7$ being depicted in FIG. 6.

Referring to FIG. 6, the geofence defined by perimeter 602 labeled $T=T_1$ depicts breaches of the geofence during a first period of interest $T_1$ whereas, the geofence defined by perimeter 602 labeled $T=T_6$ depicts breaches of the geofence during a sixth period of interest $T_6$ refers and the geofence defined by perimeter 602 labeled $T=T_7$ depicts breaches of the geofence during a seventh period of interest $T_7$.

In the example described in reference to FIG. 6, manager system 110 can determine that there are eleven (11) breaches of the geofence defined by perimeter 602 during time period on interest $T_1$, thirteen (13) breaches of the geofence defined by perimeter 602 during time period of interest $T_6$, and fourteen (14) breaches of the geofence defined by perimeter 602 during the time period of interest $T_7$. Manager system 110 can also similarly determine breaches of the geofence defined by perimeter 602, during the intermediary periods $T_2$-$T_5$ not depicted in FIG. 6.

As depicted in FIG. 6, manager system 110 can determine a position at which a client computer device of client computer devices 130A-130Z breaches a geofence. That is, in reference to FIG. 6, there are depicted X on perimeter 602 defining a geofence. The illustrated "X" at a specific position on perimeter 602 depicts a position in physical space in which a client computer device of client computer devices 130A-130Z breaches the geofence defined by perimeter 602. Embodiments herein recognize that the specific position at which a client computer device of client computer devices 130A-130Z depict a breach of geofence can be recorded and advantageously used. For determining a position at which client computer device breaches a geofence defined by a perimeter, such as perimeters 602, manager system 110 at block 1111 can examine recorded data of data repository 112. More specifically, manager system 110 for determining position of a geofence breach can examine breach occurrence data of breach occurrence data area 2122 in combination with location data of location data area 2121. As set forth herein, breach occurrence data can specify a client computer device identifier together with a timestamp. Further, location data area 2121 can specify a history of timestamped locations of a computer device identified by different identifiers. For performing determining of a position of a geofence breach, manager system 110 can examine breach occurrence data that specifies a client computer device identifier in combination with location data specifying a location of that identified client computer device to determine a location of the client computer device at the time of the breach, e.g. by examining a location of location data area 2121 of a client computer device identified with an identifier specified in breach occurrence data in common with a timestamp specified in the breach occurrence data. If the timestamps do not match precisely, the timestamp of location data area 2121 for a certain client computer device that most closely matches the timestamp specified in breach occurrence data area 2122 can be used as the timestamp that specifies the location of the breaching client computer device at the time of the breach. Where a location, using location data from location data area 2121 of data repository 112 does not match a location precisely on a perimeter 602 defining a geofence, the reported location data can be adjusted to reference position on perimeter 602, e.g. based on the closest distance to perimeter 602.

In one embodiment for improving accuracy of determined geofence breach positions, client computer devices 130A-130Z can be configured so that when sending a breach occurrence communication at block 1306 at current location of the breaching client computer device is sent together with an identifier of the client computer device and a timestamp of a breach. Such configuration can alleviate reliance on examining of data of location data area 2121. In one embodiment, manager system 110 performing examining of client computer device geofence breaches at block 1111 can include examining a progression of breaches by client computer devices of client computer devices 130A-130Z over time. In one embodiment, manager system 110 performing examining of client computer device geofence breaches can include classifying geofence breaches as occurring with respect to a determined section of a geofence. For example, in reference to FIG. 6, geofence defined by geofence perimeter 602 can be segmented into different sections. For example, sections I, II, III, and IV as specified in FIG. 6. Other sectional divisions are possible. For example, there can be fewer sections or a larger number of sections defined.

FIG. 7 illustrates a process by which manager system 110 can perform examining a progression of geofence breaches over time according to one embodiment. Referring to FIG. 7, manager system 110 can record geofence breaches over time with respect to a geofence perimeter 602 defining a geofence and for each of several time periods, e.g. $T_1$-$T_7$ can specify a number of breaches occurring within each of several sections, e.g. sections I, II, III, and IV of a geofence defined by geofence perimeter 602. On the completion of recording of geofence breach data for each of a plurality of time periods, e.g. time periods 2 in one embodiment. Manager system 110 can determine a predicted number of breaches within each section, e.g. using a regression analysis.

Referring to FIG. 7, linear regression line 702 depicts a linear regression line drawn with respect to breach data specifying breaches occurring with respect to geofence perimeter section I over the course of time periods $T_1$-$T_7$. Linear regression line 704 is a linear regression line drawn with respect to geofence breaches occurring with respect to geofence perimeter section II of geofence perimeter 602 over the plurality of time periods $T=T_1$ to $T=T_7$ and linear regression line 706 is a linear regression line for geofence breaches occurring with respect to both sections III and IV of geofence perimeter 602 defining a geofence over the course of the time periods $T=T_1$ to $T=T_7$. Manager system 110 can use the linear regression lines 702, 704, 706 and 708 to predict geofence breaches occurring at the specified sections I, II, III, and IV, respectively, at future time $T_8$, depicted in FIG. 7. According to the regression analysis depicted in FIG. 7, section I of the geofence defined by geofence perimeter 602 in the illustrated embodiment according to linear regression line 702 is predicted to experience about 11.2 breaches during time period $T_8$, section II is predicted to experience about 2.9 breaches according to linear regression line 704 during future time period of interest $T_8$, section III is predicted to experience about 0.3 breaches according to linear regression line 706 during future time period of interest $T_8$, and section IV is predicted to experience about 0.5 breaches according to linear regression line 708 during future time period of interest $T_8$. Manager system 110 can use the predicted number of breaches to determine an updated location defined by geofence perimeter 602.

Referring further to the flowchart of FIG. 4, manager system 110 at block 1112 can determine whether an activation period for a geofence has expired, e.g. as specified in geofence configuration data specified by an administrator user, using administrator user interface 500 (FIG. 5). Based on a determination that a geofence activation period has expired, manager system 110 at block 1112 can proceed to block 1114 to perform machine learning e.g. including activating machine learning process 119 (FIG. 1), as set forth herein. If on the other hand, manager system 110 at block 1112 determines that a geofence activation period is not expired, manager system 110 can proceed to block 1113 to perform establishing of an updated location of a geofence, e.g. based on an examining of geofence breaches performed at block 1111. At block 1113, manager system 110 can activate establishing process 116 (FIG. 1). For performing establishing at block 1113 manager system 110 at block 1111 can use a decision data structure stored in decision data structures area 2123 of data repository 112. An exemplary decision data structure for use by manager system 110 in performing establishing of an updated location of a geofence is set forth in Table 1.

TABLE 1

| Geofence Section with Largest Predicted of Breaches | Amount of Difference Number | Decision |
| --- | --- | --- |
| I | D(I) ≥ T1 | Move S 1 unit |
| I | D(I) ≥ T2 | Move S 2 units |
| I | D(I) < T1 | No Movement |
| II | D(II) ≥ T1 | Move W 1 unit |
| II | D(II) ≥ T2 | Move W 2 units |
| II | D(II) < T1 | No Movement |
| . | . | . |
| . | . | . |
| . | . | . |

Referring to Table 1, Table 1 is a decision data structure cognitively mapping values in dependence on predicted numbers breaches to updated geofence locations as defined by geofence location change information. Artificial intelligence (AI) decision table, as set forth in Table 1 includes three columns. The first column specifies the section of a geofence, e.g. section I, II, III, or IV having the largest number of predicted breaches for a future time period of interest, e.g. time period of interest $T_8$ as described in reference to FIG. 7. The second column of Table 1 is the column "amount of difference" which specifies in one embodiment the difference value $D(X)=B(X)-A(X)$, where D is numerical value that specifies an amount of difference, X is the section having the highest number of predicted breaches, B is the predicted number of breaches in future time period of interest, and the A is an average predicted number of breaches per section in the future time period of interest.

In Table 1, the classifications for breach activity are (a) that D is a first threshold; (b) that D is a second threshold; or (c) that D is <a first threshold. Other "amount of difference" classifications are possible. For example, with reference to Table 1, a section of a geofence having a highest predicted number of breaches can be classified into an arbitrary number of classifications, e.g. three classifications as specified in Table 1 or N classifications. In one embodiment the thresholds $T_1$ and $T_2$ as described in reference to Table 1 can be values that are determined as a percentage of a predicted average number of breaches for a geofence during a time period of interest. For example, $T_1$ and $T_2$ can be numerical values determined by calculating first and second different percentages of predicted numbers of breaches of a geofence during a future time period of interest.

In one illustrative embodiment $T_1$ can be calculated as being 30 percent of the predicted number of breaches of a geofence during a future time period of interest and $T_2$ can be calculated as being 40 percent of the predicted number of breaches of geofence during the future time period of interest. In the illustrative example of FIG. 7, $T_1$ can be calculated as $0.3((11.2+2.9+0.3+0.5))=4.47$ and $T_2=5.96$ and the predicted average number of breaches per section is $14.9/4=3.75$. Accordingly in reference to the described illustrative example described in reference to Table 1 the decision conditions yielding the decision "Move South (S) two units" applies based on $D(I)=11.2-3.75=7.45$ so that $D(I) \geq T_2$. In another embodiment, the thresholds can be functions that are based on a standard deviation of breaches that are experienced by sections of a geofence as set forth herein. The third column of Table 1 is a decision column. In the decision column there can be specified location change information that defines a new location for a geofence. The location change information can specify a direction of change as well as an offset distance of change.

According to manager system 110 providing direction change location information using a decision data structure as set forth in Table 1, can establish updated locations of a geofence that are based on a section of a geofence having a highest number of predicted breaches. As set forth in Table 1, direction in which to move a geofence can be correlated to breach activity as follows: move the geofence South (S) based on there being a threshold exceeding number of predicted geofence breaches of the geofence section I located South of a geofence center; move the geofence West (W) based on there being a threshold exceeding number of predicted geofence breaches of the geofence section II located west of a geofence center; move the geofence North (N) based on there being a threshold exceeding number of predicted geofence breaches of the geofence section III located North of a geofence center; and move the geofence East (E) based on there being a threshold exceeding number of predicted geofence breaches of the geofence section IV located east of a geofence center.

Embodiments herein recognize that a number of breaches of a geofence can be expected to increase by moving of a geofence in a direction of the highest geofence activity. For example, based on an even distribution of geofence breach directions, a certain percentage of breaches can be expected to occur at an acute angle with respect to a tangent line of a geofence perimeter 602, defining a geofence. Embodiments herein recognize that an increased number of breaches in such breaching directions can be yielded by moving of a geofence in a direction of highest breach position activity, e.g. moving South for highest South section geofence breach activity, West for highest West section geofence breach activity, North for highest North section geofence breach activity, and/or East for highest East section geofence breach activity.

A decision data structure according to Table 1 can be configured to provide more granular geofence updated location information. For example, rather than manager system 110 segmenting a geofence perimeter 602 into four sections (I, II, III, and IV), manager system 110 can instead segment a geofence perimeter into N sections, e.g. N=8, 16, etc., and direction decisions can be correspondingly made more granular, e.g. rather than encompass the directions South, West, North, and East, can encompass more granular directions in another embodiment, e.g., South, Southwest, West, Northwest, North, Northeast, East, and Southeast, or other directions intermediate of the described directions. Offset distance units specified in column three of Table 1, can also specify additional and more granular alternatives.

Embodiments herein recognize that whether or not movement of a geofence increases a number of breaches, can be in dependence on a travelling direction of client computer devices in an environment including a geofence, e.g. a geofence defined by perimeter 602 as set forth in FIG. 6. For example, referring to FIG. 6 movement of the geofence defined by geofence perimeter 602 South may result in yielding of an additional breach by a client computer device travelling along path 622 running parallel to center tangent line 620 of section I, but may not result in additional breaches being yielded by the client computer device travelling along path 624 based on the client computer device travelling along path 624 (running perpendicular to center tangent line 620 of section I) breaching the geofence defined by geofence perimeter 602 in any respect without an updated location of the geofence. In some embodiments geofence breach position data subject to examining by manager system 110 is filtered based on breach direction, so that breaches in a direction that are more parallel to a geofence perimeter tangent line (e.g. as determined by a threshold), are preferentially examined relative to breach positions attributable to travel paths that are angles tending towards normal angles with respect to geofence perimeter tangent lines.

In one embodiment, in reference to FIG. 7, data recorded in the graphical data depiction of FIG. 7 can be filtered so that only geofence breaches attributable to travel paths at angles with respect to geofence perimeter tangent lines of less than a threshold number of degrees, are recorded in the data set depicted in FIG. 7. Thus, manager system 110 can be configured to be more responsive to breaches at travel path directions likely to be more sensitive to geofence location updates.

For determining a path direction of a geofence breach, manager system 110 can examine a history of locations for a breaching client computer device using data of location data area 2121 of data repository 112. Manager system 110 for determining a traveled direction of a breaching client computer device can in addition or alternatively examine data of social media system 140, e.g. such as posts content which can be examined running NLP process 113 that may specify one or more locations of a user of a client computer device at one or more specified points in time and also such data as calendar data that may be included in data respecting a user within social media system 140. In one embodiment, manager system 110 can determine a travel path and direction of a breaching client computer device using data of location data area 2121 and can use data of social media system 140 to determine confidence levels associated with determined traveling paths and directions of breaching client computer devices.

In one embodiment manager system 110 at block 1113 can perform the described establishing conditionally based on one or more criterion being satisfied. In one embodiment, manager system 110 can deploy a geofence at block 1107 based on configuration data received at block 1105 that specifies a target number of breaches for an activation period of a geofence. As described with reference to administrator user interface 500, as shown in FIG. 5, target number of breaches can be specified in area 520, e.g. by administrator user selection or by automated selection based on, e.g. past performance data of geofences previously used by system 100 having characteristics in common with a geofence currently being configured.

In one embodiment manager system 110 at block 1113 performs establishing an updated location for geofence conditionally on the condition that a current geofence is an underperforming geofence. For example, on the specifying by an administrator user using area 520, a target number of breaches of a geofence being configured, which target number can also be automatically determined as set forth herein. Manager system 110 can determine a schedule of cumulative geofences that must have been yielded at the conclusion of each time period of interest subject to examination during a geofence activation period. The schedule can take into account for example, that geofence breach rates are not constant during the course of a day or a week. Manager system 110 at block 1113 can examine the geofence breach tracking schedule to determine whether the current geofence is on track to achieve a target number of breaches, e.g. the number of breaches specified automatically or by administrator user selection within area 520 of administrator user interface 500.

Based on the current number of cumulative geofence breaches being below the target number as specified by the schedule, manager system 110 can proceed to perform the establishing of an update geofence location at block 1113 to increase a yield of geofence breaches. On the other hand, manager system 110 can restrict the performing of establishing of an updated geofence location at block 1113 based on a determining that a current geofence is on track to yield at least the target number of breaches specified by the described geofence breach tracking schedule.

In one embodiment, manager system 110 at block 1113 can restrict the establishing of an updated location of a geofence if the updated location is not permitted according to machine logic rules that specify restrictions on a location of a geofence. Embodiments herein recognize that deploying a geofence such as a geofence defined by a geofence perimeter 602 to encompass a venue 122 (FIG. 1) can provide numerous advantages. For example, client computer devices that breach a geofence by definition will be at a location that is geographically related to the location of venue 122. In one embodiment machine logic rules can be employed to assure that a geofence having an updated location notwithstanding being an updated location, remains a location that is related to the location of venue 122. In one embodiment a machine logic rule can be established so that the location of geofence defined by geofence perimeter 602 while being subject to updating is restricted to be at a location so that a geofence perimeter 602 encompasses a location of interest such as location of interest 601 (FIG. 5) that specifies a location of venue 122.

In one embodiment, according to a machine logic rule employed by manager system 110, the size of a geofence can be restricted to be of a constant size throughout an activation period of a geofence. For example, referring to geofence defined by geofence perimeter 602 manager system 110 can employ a machine logic rule so that the area defined by geofence perimeter 602 remains constant through an activation period of the geofence. Such restricting can assure that the geofence performs predictably and consistently throughout an activation period of the geofence and facilitates processing wherein the geofence defined by geofence perimeter 602 is processed as being a single logical geofence throughout an activation period thereof in spite of it changing position.

Figure 8:
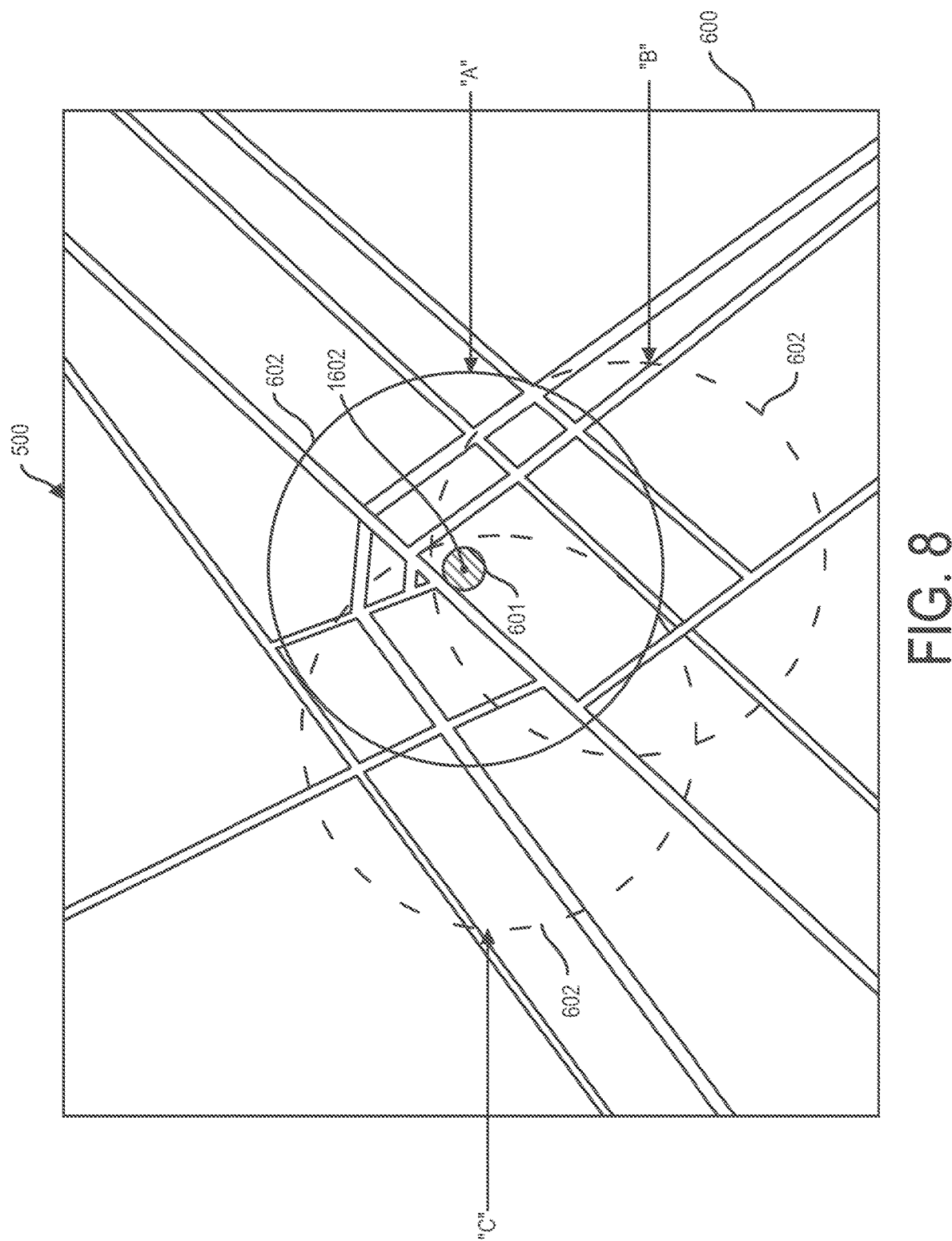
FIG. 8 depicts a geofence migrating throughout an environment according to one embodiment.

In one embodiment manager system 110 can be configured so that a deployed geofence defined by geofence perimeter 602 has characteristics as depicted in FIG. 8 over the course of an activation period of the geofence. FIG. 8 depicts area 600 of administrator user interface 500 as shown in FIG. 5 over the course of a plurality of time periods of interest according to one embodiment. At a time of initial deployment (block 1107) the geofence defined by geofence perimeter 602 can be at depicted location "A" so that a center 1602 of a geofence defined by perimeter 602 depicted in the area 600 can be centered on location of interest 601 which can be specified by an administrator user using administrator user interface 500 to be the location of venue 122 (FIG. 1).

In an illustrative use case, geofence breaches can be dominant at a "South" section during early time periods of interest of a geofence activation period and accordingly the geofence defined by geofence perimeter 602 can migrate South as depicted by dashed geofence perimeter 602 at location "B".

During later time periods of interest of an activation period of the geofence, geofence breaches occurring at a "West" section of a geofence perimeter 602 can be dominate and accordingly the geofence defined by geofence perimeter 602 can migrate west as depicted by the dashed geofence perimeter 602 at location "C" of FIG. 8. Thus, the described manager system 110 can iteratively update the location of the geofence defined by geofence perimeter 602 so that the location of the geofence migrates throughout different locations of an area over time.

However, in one embodiment for each location update manager system 110 can enforce restrictions such as those described. According to one restriction, manager system 110 can restrict an updated location of a geofence having geofence perimeter 602 so that an updated location a geofence perimeter 602 continues to encompass region of interest 601 which can be specified to be the location of venue 122. According to another restriction that can be enforced, manager system 110 can enforce the restriction that the geofence defined by geofence perimeter 602 remains of a constant size through the activation period of the geofence. Such restricting can facilitate processing of the defined geofence as a logically unchanged geofence through an activation period of the geofence. On the establishing of the updated location of the geofence at block 1113 manager system 110 can proceed to update a location of a geofence so that a current geofence has the location of the updated location determined by the establishing at block 1113.

For updating the location of a geofence, manager system 110 at block 1107 can proceed to block 1107 to send geofence data to client computer devices 130A-130Z. The geofence data sent at block 1107 can include geofence location change data. Regarding block 1107, it will be seen that for a first iteration of block 1107 responsively to receipt of configuration data at block 1106, geofence location data sent at block 1107 can include geofence location data for initial deployment of a geofence at an initial location. During second to Nth iterations of block 1107 geofence data sent at block 1107 responsively to performing of establishing at block 1113 can include geofence location change data that specifies a change of location of a deployed geofence. The change location data can include, e.g. one or more of a direction change of a deployed geofence or an offset distance change of a geofence. The direction change data can include such data as the directions, South, West, North, East, or in the case of a more granular configuration can include, South, Southwest, West, North, Northeast, East, and Southeast. The distance offset information can take on different forms in different embodiments in system 100.

The geofence location change data as set forth herein can be determined using a decision data structure, such as the decision data structure described with reference to Table 1 according to one embodiment. Manager system 110 sending geofence location change data to client computer devices 130A-130Z can include manager system 110 sending location change data to respective breach determination processes being run by respective client computer devices 130A-130Z so that on receipt of the location change data by the respective client computer devices at block 1304 the respective client computer devices 130A-130Z are enabled to detect geofence breaches with respect to an updated location of a deployed geofence.

According to one advantage of a geofence as set forth herein, the geofence can be configured to be subject to location change but can be processed as a logically constant geofence throughout the location changes. Embodiments herein recognize that restricting location changes of a geofence can facilitate processing of a geofence as a logically constant geofence, notwithstanding location changes of a geofence. Restrictions on location changes can include such restrictions as (a) that a geofence be restricted to locations that encompass region of interest, e.g. region of interest 601 as shown in FIG. 8, (b) that a geofence retains a constant size throughout an activation period of a geofence also as depicted in FIG. 8, (c) the geofence is restricted to location change in a predetermined set of directions and/or (d) a distance offset of a location change can be restricted, e.g. to one or a predetermined number or distance units, wherein the distance units can be limited, e.g. in increments of 10 meters, 50 meters, 100 meters, 500 meters, or 1 kilometer according to some examples. One or more of the above types of restrictions can be useful in providing a geofence that can be processed as a logically constant geofence throughout an activation period of the geofence.

Embodiments herein accordingly permit performance of geofence aided location based services (LBS) even where a geofence is currently located differently by different client computer devices 130A-130Z. It is expected for example that at block 1107, in response to performing of establishing at block 1113 some client computer devices 130A-130Z may be unavailable for updating. For example, a certain number of client computer devices of client computer devices 130A-

130Z may be shut off (powered down) or out of range at a time of location data sending at block 1107. Further, some client computer devices of client computer devices 130A-130Z may have configured settings that permit updating of such client computer devices only at limited times. Therefore, it is expected that in some scenarios, some client computer devices 130A-130Z can be performing geofence breach determinations based on a current (most recent) updated location of a geofence whereas other client computer devices of client computer devices 130A-130Z may be performing breach determination based on a location of the geofence that is one or more iteration prior to the current iteration. Notwithstanding because of features set forth herein that permit a geofence to be processed as a logically common geofence throughout location changes, breach determinations based on prior locations of a geofence can be processed as valid breaches by manager system 110 on receipt of a breach occurrence communication at block 1108. There is set forth herein a process for updating a geofence wherein the updating a location of the geofence includes sending location change information to update geofence breach determination logic locally running on a plurality of client computer devices, and wherein the method includes the plurality of client computer devices e.g. client computer devices of client computer devices 130A-130Z asynchronously performing updates of their respective geofence breach determination logic based on the location change information so that during an iteration of the examining, the examining includes examining breach information of a first client computer device and a second client computer device, wherein the first client computer device uses a first location of the geofence and the second client computer device uses the second location of the geofence.

According to one embodiment, record data subject to examining regarding breaches of a geofence can be agnostic to the particular location of a breach at a time of a breach. For example, for providing low overhead processing, geofence breaches over time data recorded as set forth in FIG. 7 and subject to regression analysis for performing of geofence breach predictions may but need not include a record of a location of a geofence at a time of a breach (e.g. may use a section of the beach without using a location of a geofence). Machine logic features set forth herein can be self-correcting in that the simple machine logic processing set forth herein without respect to a geofence location can optimize breach yields without retention of a record of a geofence location.

The exemplary decision data structure as set forth in Table 1 has specific parameter values, e.g. involving threshold parameter values and distance unit parameter values. In one embodiment, manager system 110 can run machine learning process 119, e.g. at block 1114 and/or at block 1109, to iteratively update the decision data structure such as the decision data structure of Table 1 by machine learning. In one embodiment, manager system 110 can monitor performance of current logic for determining geofence location updates. Performance can be monitored based on one or more criterion, e.g. the number of breaches or the correspondence between a number of breaches and predicted number of breaches. Manager system 110 running machine learning process 119 in one embodiment can iteratively examine performance of manager system 110 across a distribution of instances, wherein each instance employs differently configured decision data structure (e.g. having differentiated parameter values) for driving a geofence location update decision.

Manager system 110 can be running a plurality of instances of blocks 1102-1105 for a plurality of geofences. For each instance, manager system 110 can change parameter values as shown in Table 1 within valid ranges to facilitate searching of optimum values and manager system 110 by running machine learning process 119 can update the parameter values over the time so that the parameter values over time (as more sample data is accrued) converge on values that are optimally performing values. Based on a result of monitoring of different instances over time, manager system 110 running machine learning process 119 can bias the variety of the decision data structures employed, so that the decision data structures of decision data structures area 2123 assume the characteristics of the most successfully performing iterations.

At block 1115 manager system 110 can return to block 1105 to wait for configuration data defining a new geofence for deployment.

Certain embodiments herein may offer various technical computing advantages involving computing advantages to address problems arising in the realm of computer networks. Particularly, computer networks operating to provide location based services (LBS). Embodiments herein can include migrating geofence that can change locations which can be featured to permit processing of the geofence as a logically constant geofence throughout an activation period of the geofence, notwithstanding location changes thereof. Embodiments herein can permit a geofence to automatically migrate over time to yield additional geofence breaches based on a determination in one embodiment that the geofence is underperforming. Provided herein according to one embodiment, are processes that permit a geofence to be updated in terms of location automatically without administrator reconfiguration of a geofence, to permit target goals associated with the geofence to be satisfied with reduced processing overhead. Embodiments herein permit migration of a location of a geofence, but have features so that the geofence operates consistently and predictably notwithstanding the migrations to facilitate satisfaction of target breach goals. Embodiments herein can feature regression analysis to predict perimeter locations of future geofence breaches and to establish location changes in accordance with the predicted breaches. Embodiments herein recognize that distribution of geofence breach determination logic to client computer devices for local on-device breach determination can yield significant improvements in computer network performance, e.g., in terms of bandwidth and power conservation, speed and reliability, but that the advantages can be lost if a geofence is not accurately deployed. Accordingly, features can be provided for lightweight updating of geofence location. Embodiments herein can update a distributed geofence using reduced bandwidth and processing resources. Embodiments herein can feature a distributed geofence and provisions can be included so that updates of a geofence location can be implemented asynchronously by a set of computer devices. Embodiments can process and store data respecting a geofence as a logically constant geofence notwithstanding location changes of the geofence and differentiated locations of the geofence between client computer devices of client computer devices. Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Figure 9:
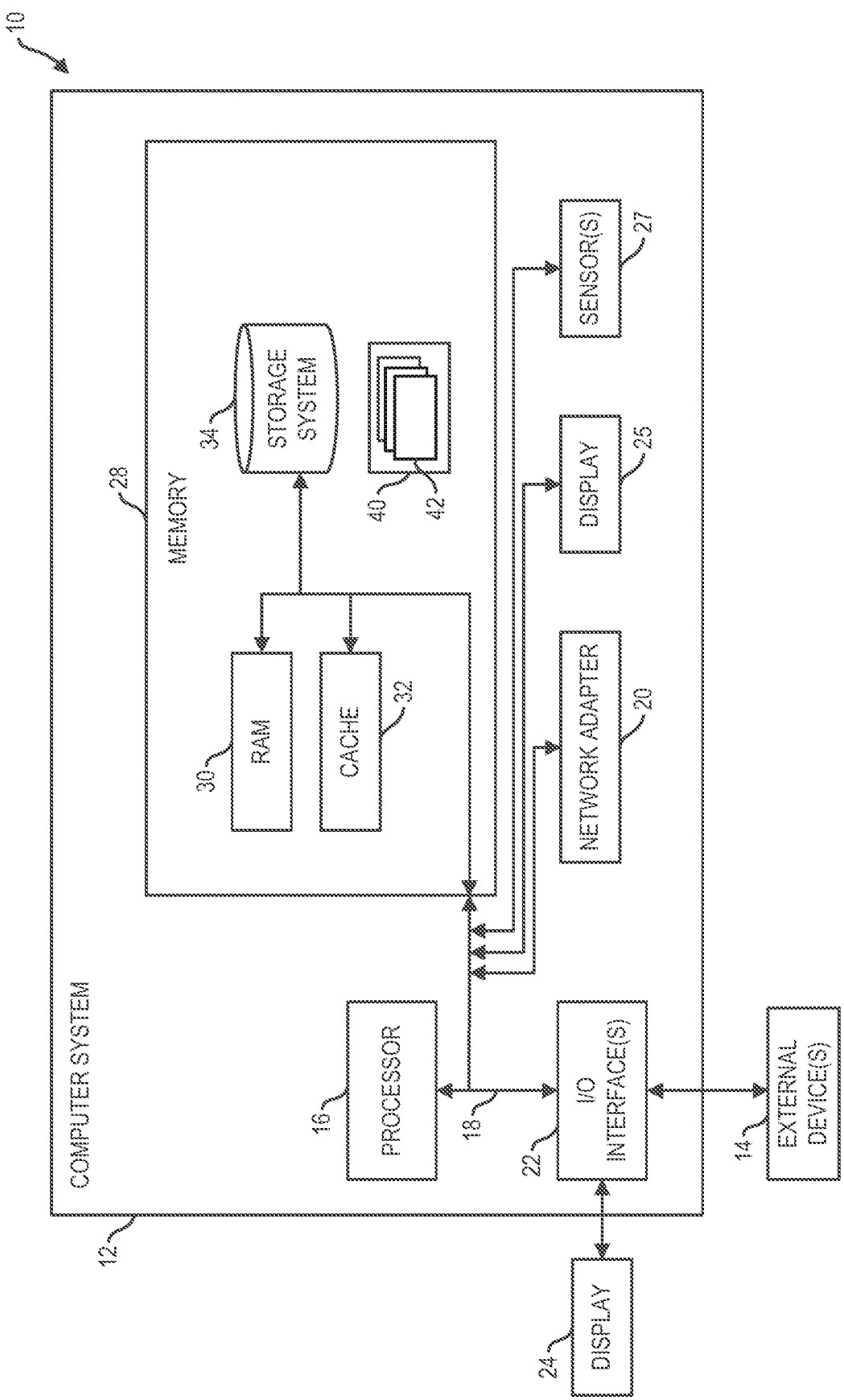
FIG. 9 depicts a computing node according to one embodiment.
Figure 10:
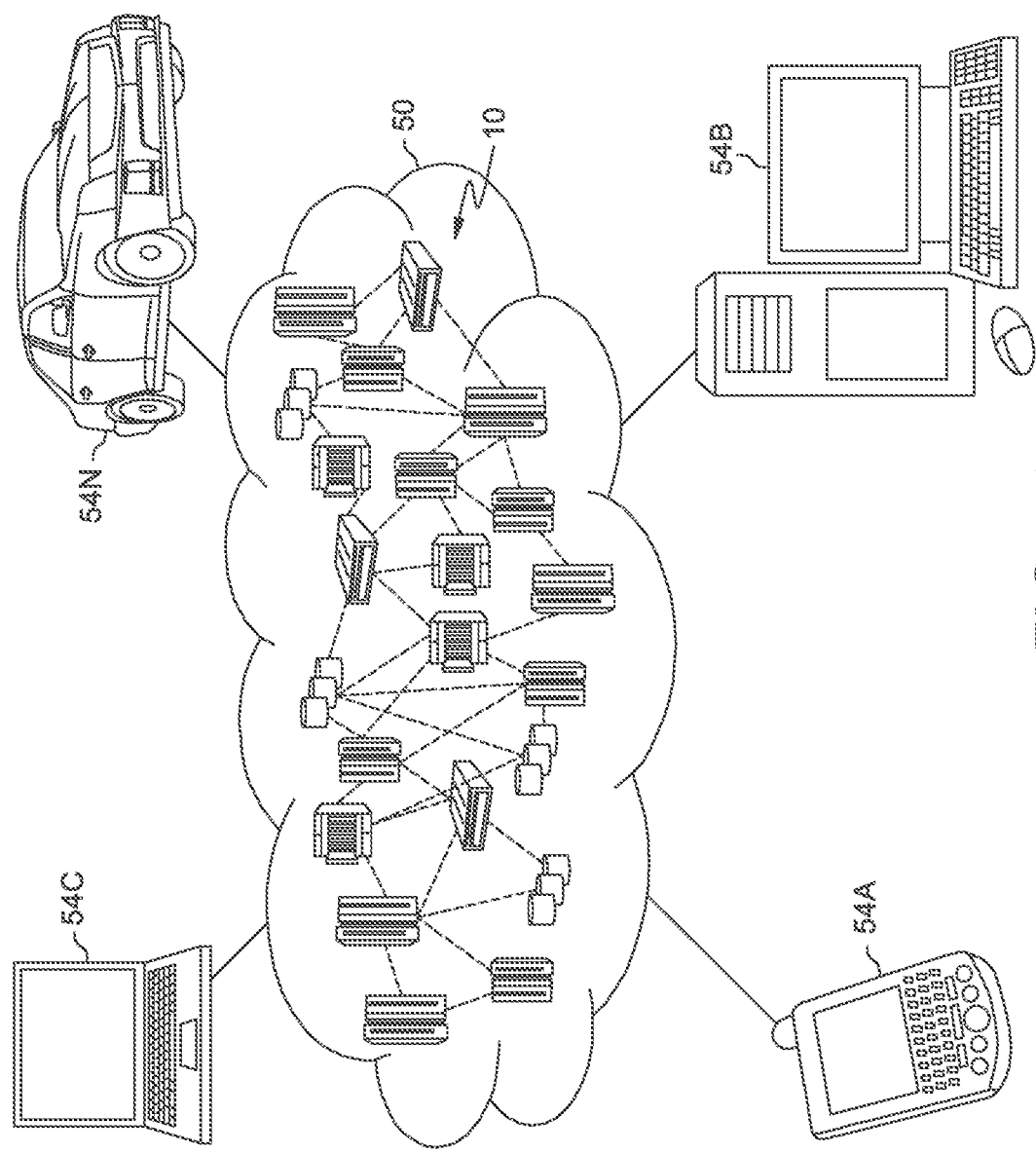
FIG. 10 depicts a cloud computing environment according to one embodiment.
Figure 11:
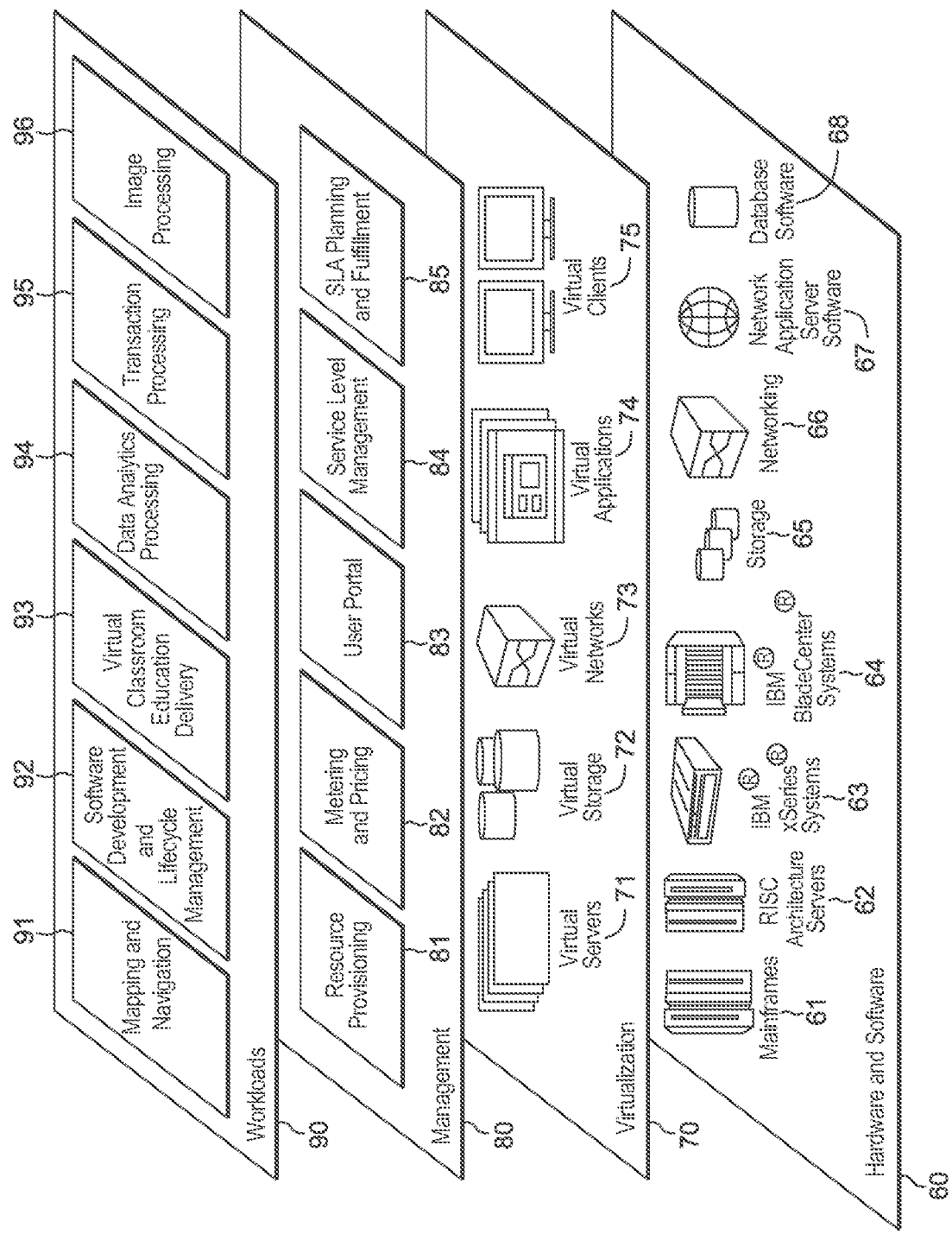
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2 and functions described with reference to method 300 of FIG. 3 and functions described with reference to manager system 110 as set forth in the flowchart of FIG. 4. In one embodiment, one or more client computer device 130A-130Z can include one or more computing node 10 and can include one or more program 40 for performing functions described with reference to one or more client computer device 130A-130Z as set forth in the flowchart of FIG. 4. In one embodiment, administrator client computer device 125 can include one or more computing node 10 and can include one or more program 40 for performing functions described with reference to administrator client computer device 125 as set forth in the flowchart of FIG. 4. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:

examining data of breaches of a geofence by client computer devices;

updating a location of the geofence so that the location of the geofence is an updated location, wherein the updating is in dependence on the examining data of breaches of a geofence by client computer devices;

obtaining data of a client computer breach of the geofence at the updated location; and providing one or more output in response to the obtaining data of a client computer breach of the geofence at the updated location, wherein the updating a location of the geofence includes moving the geofence a distance that is in dependence on a number of predicted breaches of the geofence.

2. The method of claim 1, wherein the examining includes determining a certain region of a perimeter of the geofence as having a highest predicted number of breaches and wherein the updating includes performing the updating so that the updated location is based on the determined certain region, wherein the updating a location of the geofence includes moving the geofence in a direction that is in dependence on a position of the certain region on the perimeter.

3. The method of claim 1, wherein the examining includes determining a certain region of a perimeter of the geofence as having a highest predicted number of breaches and wherein the updating includes performing the updating so that the updated location is based on the determined certain region, wherein the updating a location of the geofence includes moving the geofence in a direction that is in dependence on a position of the certain region on the perimeter and by a distance that is in dependence on a number of predicted breaches at the certain region.

4. The method of claim 1, wherein the updating a location of the geofence includes moving the geofence in a direction that is in dependence on a position of a certain region of a perimeter of the geoface determined to have a highest number of predicted breaches.

5. The method of claim 1, wherein the updating a location of the geofence includes sending location change information to update geofence breach determination logic locally running on a plurality of client computer devices, and wherein the method includes the plurality of client computer devices asynchronously performing updates of their respective geofence breach determination logic based on the location change information so that during an iteration of the examining, the examining includes examining breach information of a first client computer device and a second client computer device, wherein the first client computer device uses a first location of the geofence and the second client computer device uses a second location of the geofence.

6. The method of claim 1, wherein the examining includes determining a certain region of a perimeter of the geofence as having a highest predicted number of breaches and wherein the updating includes performing the updating so that the updated location is based on the determined certain region, wherein the updating a location of the geofence includes updating the location of the geofence in dependence on a difference between a predicted number breaches at the certain region of the perimeter and a predicted average number of breaches per region of the perimeter.

7. The method of claim 1, wherein the examining includes determining a certain region of a perimeter of the geofence as having a highest predicted number of breaches and wherein the updating includes performing the updating so that the updated location is based on the determined certain region, wherein the updating a location of the geofence includes updating the location of the geofence in dependence on a predicted number breaches at the certain region of the perimeter.

8. The method of claim 1, wherein the examining includes determining a certain region of a perimeter of the geofence as having a highest predicted number of breaches and wherein the updating includes performing the updating so that the updated location is based on the determined certain region.

9. The method of claim 1, wherein the updating a location of the geofence includes updating the location of the geofence in response to a difference between a predicted number breaches at a certain region of a perimeter the geofence and a predicted average number of breaches per region of the perimeter satisfying a threshold criterion.

10. The method of claim 1, wherein the examining data of breaches of a geofence by client computer devices includes examining certain breach data obtained from a certain mobile client computer device of the client computer devices, the certain mobile client computer device, locally on the certain mobile client computer device determining of a breach of the geofence by the certain mobile client computer device to provide the certain breach data.

11. The method of claim 1, wherein the updating a location of the geofence includes moving the geofence a distance that is in dependence on a position of predicted breaches of the geofence.

12. The method of claim 1, wherein the examining includes determining a certain region of a perimeter of the geofence as having a highest predicted number of breaches and wherein the updating includes performing the updating so that the updated location is based on the determined certain region, wherein the updating a location of the geofence includes updating the location of the geofence in response to a threshold criterion being satisfied, wherein satisfaction of the threshold criterion is in dependence on a relationship between a predicted number breaches at the certain region of the perimeter and a predicted number of breaches over an entirety of the perimeter.

13. The method of claim 1, wherein the updating a location of the geofence includes updating the location of the geofence in dependence on a relationship between a predicted number breaches at a certain region of a perimeter of the geofence and a predicted number of breaches over an entirety of the perimeter.

14. The method of claim 1, wherein the examining data of breaches of a geofence by client computer devices includes examining certain breach data obtained from a certain mobile client computer device of the client computer devices, the certain mobile client computer device, locally on the certain mobile client computer device determining of a breach of the geofence by the certain mobile client computer device to provide the certain breach data, wherein the determining of the breach locally by the certain mobile client computer device is in dependence on network connectivity of the mobile client computer device.

15. The method of claim 1, wherein the examining includes examining data of breaches of a geofence by client computer devices to determine respective positions and directions of the breaches, wherein the examining to determine the directions of the breaches includes examining historical travel path data of the client computer devices to determine travelling directions of respective client computer devices associated to the respective breaches.

16. The method of claim 1, wherein the method includes predicting that a certain region of a perimeter of the geofence will have a highest number of breaches, and wherein the updating includes moving the geofence in a direction that is in dependence on a position of a certain region on the perimeter.

17. The method of claim 1, wherein the geofence has an associated point of interest and wherein the updated location is restricted to locations encompassing the point of interest, wherein the examining includes examining data of breaches of a geofence by client computer devices to determine respective positions and directions of the breaches, wherein the examining to determine the directions of the breaches includes examining historical travel path data of the client computer devices to determine for respective ones of the breaches a travelling direction of a breaching client computer device associated to the breach, wherein the updating a location of the geofence includes sending location change information to update geofence breach determination logic locally running on a plurality of mobile client computer devices defining the client computer devices, and wherein the method includes the plurality of mobile client computer devices asynchronously performing updates of their respective geofence breach determination logic based on the location change information so that during an iteration of the examining, the examining includes examining breach information of a first mobile client computer device and a second mobile client computer device of the plurality of mobile client devices, wherein for providing the breach information of the first mobile client computer device and the second mobile client computer device examined during the iteration of the examining, the first mobile client computer device at a first time uses a first location of the geofence to determine that the first mobile client computer device has breached the geofence, and the second mobile client computer device at the first time uses a second location of the geofence to determine that the second mobile client computer device has breached the geofence.

18. The method of claim 1, wherein the examining data of breaches of a geofence by client computer devices includes examining certain breach data obtained from computer devices of the client computer devices, the computer devices locally determining breaches of the geofence by respective ones of the computer devices to provide the certain breach data.

19. A computer program product comprising:
one or more computer readable storage medium readable by one or more processing circuit and storing instructions for execution by one or more processor for performing a method comprising:
examining data of breaches of a geofence by client computer devices;
updating a location of the geofence so that the location of the geofence is an updated location, wherein the updating is in dependence on the examining data of breaches of a geofence by client computer devices;
obtaining data of a client computer breach of the geofence at the updated location; and
providing one or more output in response to the obtaining data of a client computer breach of the geofence at the updated location, wherein the updating a location of the geofence includes moving the geofence a distance that is in dependence on a number of predicted breaches of the geofence.

20. A system comprising:
a memory;
at least one processor in communication with the memory; and
program instructions executable by one or more processor via the memory to perform a method comprising:
examining data of breaches of a geofence by client computer devices;
updating a location of the geofence so that the location of the geofence is an updated location, wherein the updating is in dependence on the examining data of breaches of a geofence by client computer devices;
obtaining data of a client computer breach of the geofence at the updated location; and
providing one or more output in response to the obtaining data of a client computer breach of the geofence at the updated location, wherein the updating a location of the geofence includes moving the geofence a distance that is in dependence on a number of predicted breaches of the geofence.

* * * * *